(12) United States Patent
Nagafuchi et al.

(10) Patent No.: US 11,059,111 B2
(45) Date of Patent: Jul. 13, 2021

(54) CUTTING INSERT AND INDEXABLE BALL END MILL

(71) Applicant: Mitsubishi Hitachi Tool Engineering, Ltd., Tokyo (JP)

(72) Inventors: Kenji Nagafuchi, Narita (JP); Yasuhiro Kiuchi, Narita (JP); Yoshiyuki Kobayashi, Narita (JP)

(73) Assignee: MOLDINO Tool Engineering, Ltd., Tokyo (JP)

( * ) Notice: Subject to any disclaimer, the term of this patent is extended or adjusted under 35 U.S.C. 154(b) by 83 days.

(21) Appl. No.: 16/463,115

(22) PCT Filed: Aug. 1, 2018

(86) PCT No.: PCT/JP2018/028871
§ 371 (c)(1),
(2) Date: May 22, 2019

(87) PCT Pub. No.: WO2019/044343
PCT Pub. Date: Mar. 7, 2019

(65) Prior Publication Data
US 2020/0070259 A1    Mar. 5, 2020

(30) Foreign Application Priority Data

Aug. 30, 2017   (JP) ............................. JP2017-165664

(51) Int. Cl.
*B23C 5/14* (2006.01)
*B23C 5/10* (2006.01)
*B23C 5/24* (2006.01)

(52) U.S. Cl.
CPC .......... *B23C 5/1045* (2013.01); *B23C 5/2472* (2013.01)

(58) Field of Classification Search
CPC ............ B23C 5/1045; B23C 2210/168; B23B 2205/12
See application file for complete search history.

(56) References Cited

U.S. PATENT DOCUMENTS

| 6,840,716 | B2* | 1/2005 | Morgulis | ................ B23C 5/109 407/103 |
| 2006/0056926 | A1* | 3/2006 | Riviere | ................. B23C 5/2213 407/40 |

(Continued)

FOREIGN PATENT DOCUMENTS

| CN | 103418823 A | 12/2013 |
| CN | 105215445 A | 1/2016 |

(Continued)

OTHER PUBLICATIONS

Notice of Allowance dated Sep. 2, 2020, issued for Korean Patent Application No. 10-2020-7008197 and English translation thereof.

(Continued)

*Primary Examiner* — Alan Snyder
(74) *Attorney, Agent, or Firm* — Locke Lord LLP

(57) ABSTRACT

A cutting insert includes a rake face, a seating face facing an opposite side to the rake face and seated on an insert mounting seat, and a flank face extending around the rake face and the seating face, in which two cutting edges each having an arcuate cutting edge portion extending in an arc shape and a linear cutting edge portion which is in contact with the arcuate cutting edge portion are formed on an intersecting ridgeline portion between the rake face and the flank face, a groove portion having a wall surface coming into contact with a projection portion protruding from a bottom surface of the insert mounting seat is formed on the seating face, and the groove portion has a narrow width portion in which a groove width decreases from one end side (Continued)

toward the other end side in a direction in which the groove portion extends.

10 Claims, 20 Drawing Sheets

(56) References Cited

U.S. PATENT DOCUMENTS

| | | |
|---|---|---|
| 2015/0016900 A1 | 1/2015 | Jansson |
| 2016/0067805 A1 | 3/2016 | Nickel |

FOREIGN PATENT DOCUMENTS

| | | |
|---|---|---|
| CN | 105269058 A | 1/2016 |
| CN | 105792968 A | 7/2016 |
| DE | 3405211 A1 | 8/1985 |
| DE | 3533125 A1 | 3/1987 |
| EP | 0300172 A2 | 1/1989 |
| EP | 0842723 A1 | 5/1998 |
| JP | 05-067414 U | 9/1993 |
| JP | 06-071505 A | 3/1994 |
| JP | 08-039326 A | 2/1996 |
| JP | 09-174322 A | 7/1997 |
| JP | 09-512488 A | 12/1997 |
| JP | H10-235513 A | 9/1998 |
| JP | 11-070404 A | 3/1999 |
| JP | 11-197933 A | 7/1999 |
| JP | 2000-190116 A | 7/2000 |
| JP | 2002-355716 A | 12/2002 |
| JP | 2004-520949 A | 7/2004 |
| JP | 2017-506164 A | 3/2017 |
| KR | 10-2005-0109572 A | 11/2005 |
| KR | 10-2014-0106762 A | 9/2014 |
| KR | 10-2016-0068442 A | 6/2016 |
| WO | 95/29026 A1 | 11/1995 |
| WO | 2004/082877 A1 | 9/2004 |
| WO | 2015/125130 A1 | 8/2015 |

OTHER PUBLICATIONS

Office Action dated Sep. 7, 2020, issued for Chinese Patent Application No. 201880052332.0 and English translation thereof.
International Search Report dated Nov. 6, 2018, issued for PCT/JP2018/028871 and English translation thereof.
Notice of Allowance dated May 14, 2019, issued for the Japanese patent application No. 2019-502034 and English translation thereof.
Office Action dated Jun. 23, 2020, issued for Korean Patent Application No. 10-2020-7008197 and English translation thereof.
Supplementary European Search Report dated Apr. 30, 2021, issued for European Patent Application No. 18850537.4.

* cited by examiner

CUTTING INSERT AND INDEXABLE BALL END MILL

TECHNICAL FIELD

The present invention relates to a cutting insert to be detachably attached to an insert mounting seat formed at a tip end portion of an end mill main body of an indexable ball end mill and the indexable ball end mill which is detachably attached to the cutting insert.

Priority is claimed on Japanese Patent Application No. 2017-165664, filed on Aug. 30, 2017, the content of which is incorporated herein by reference.

BACKGROUND ART

In the cutting insert to be used in such an indexable ball end mill, cutting inserts in which two arcuate cutting edge portions are formed on opposite sides in a circumferential direction of a rake face are known. In such a cutting insert, since a side surface of the cutting insert which becomes a flank face connected to these arcuate cutting edge portions is convexly curved, due to a cutting load during cutting operating, the cutting insert is easily displaced along the curvature of the flank face connected to the arcuate cutting edge portions on the side opposite to the arcuate cutting edge portions used for cutting. Therefore, for example, PTLs 1 and 2 disclose that a projection portion protruding from a bottom surface of the insert mounting seat is formed, and a groove portion having a wall surface capable of coming into contact with the projection portion is formed on a seating face of the cutting insert, thereby preventing such a cutting insert from being displaced.

Here, PTL 1 discloses that only one of two opposing wall surfaces of a groove portion is brought into contact with one side surface of the projection portion. In addition, PTL 2 discloses that by forming a main cutting edge and a minor cutting edge each having an arcuate cutting edge portions and a linear cutting edge portion and making the main cutting edge and the minor cutting edge asymmetrical, the arcuate cutting edge portion of two kinds of cutting inserts having the same shape and the same size each other performs cutting from a vicinity of the axis of a tip end of the end mill main body to the outer periphery and cutting from a position distant from the axis to the outer periphery.

CITATION LIST

Patent Literature

[PTL 1] Japanese Unexamined Patent Application, First Publication No. H9-174322
[PTL 2] Japanese Unexamined Patent Application, First Publication No. H11-197933

SUMMARY OF INVENTION

Technical Problem

In the cutting inserts disclosed in the drawings of PTLs 1 and 2, the two opposing wall surfaces of the groove portion are shown to extend in parallel to each other. However, in a case where the wall surface of the groove portion extends in parallel, if a width of the projection portion is increased in order to increase a rigidity of the projection portion of the end mill main body to secure a strength against a displacement of the cutting insert, the width of the groove portion of the cutting insert also becomes large, since the strength of the cutting insert is lowered, and damage may easily occur due to the load during the cutting operating. On the other hand, if the width of the groove portion is made to be small in order to secure the strength of the cutting insert, the width of the projection portion of the end mill main body also has to be reduced. Therefore, a mounting rigidity of the cutting insert cannot be secured, and there is a possibility that it is impossible to reliably prevent the cutting insert from being displaced due to the load during the cutting operating.

The present invention has been made under such circumstances, and an object of the present invention is to provide a cutting insert capable of reliably preventing displacement during the cutting operating without impairing the strength of the cutting insert, and an indexable ball end mill in which the cutting insert is detachably attached.

Solution to Problem

In order to solve the above-mentioned problems, the cutting insert of the present invention is a cutting insert to be detachably attached to an insert mounting seat formed at a tip end portion of an end mill main body of an indexable ball end mill rotatable about an axis, the cutting insert including a rake face facing a direction of rotation of the end mill main body, a seating face facing an opposite side to the rake face and configured to be seated on a bottom surface of the insert mounting seat, and a flank face extending around the rake face and the seating face, in which two cutting edges each having an arcuate cutting edge portion extending in an arc shape in plan view when viewed from a direction opposed to the rake face and a linear cutting edge portion extending so as to be in contact with the arcuate cutting edge portion are formed on an intersecting ridgeline portion between the rake face and the flank face so that the arcuate cutting edge portion and the linear cutting edge portion are alternately positioned in a circumferential direction of the rake face, a groove portion having a wall surface configured to be capable of coming into contact with a projection portion protruding from the bottom surface of the insert mounting seat is formed on the seating face, and the groove portion has a narrow width portion in which a groove width decreases from one end side toward the other end side in a direction in which the groove portion extends.

In addition, the indexable ball end mill of the present invention is an indexable ball end mill in which such a cutting insert is detachably attached to an insert mounting seat which is formed at a tip end portion of an end mill main body rotatable about an axis by bringing a wall surface of the groove portion into contact with a projection portion protruding from a bottom surface of the insert mounting seat.

In such a cutting insert and an indexable ball end mill, since the groove portion of the cutting insert has the narrow width portion where the groove width narrows from one end side to the other end side in the direction in which the groove portion extends, at the other end side where the groove width of the narrow width portion becomes narrow, and the thickness of the cutting insert can be secured to disperse the stress and improve the strength. On the other hand, since the groove width becomes wider on one end side of the narrow width portion, in the indexable ball end mill, the projection portion is formed in a portion where the narrow width portion of the groove portion abuts, it is possible to enhance the mounting rigidity with respect to the load at the time of cutting operating and reliably prevent the displacement of the cutting insert by forming it so as to be wider from the other end side in a direction where the groove portion extends to the one end side.

In addition, one of the two cutting edges is a main cutting edge and the other is a minor cutting edge, the arcuate cutting edge portion of the minor cutting edge is formed to have the same radius as that of the arcuate cutting edge portion of the main cutting edge and have a shorter length than a length of the arcuate cutting edge portion of the main cutting edge in the circumferential direction, and in a case where the cutting insert is made asymmetric as described in PTL 2, the main cutting edge of the arcuate cutting edge portion of two kinds of cutting inserts having the same shape and the same size each other can perform cutting from a vicinity of the axis of a tip end of the end mill main body to the outer periphery and the minor cutting edge of the arcuate cutting edge portion can perform cutting from a position distant from the axis to the outer periphery. Therefore, a management of the cutting insert becomes easy and economical.

In this case, the groove portion extends from an arcuate cutting edge portion side of the minor cutting edge toward a linear cutting edge portion side of the main cutting edge, it is preferable that the narrow width portion is formed such that the linear cutting edge portion side of the main cutting edge is the one end side and the arcuate cutting edge portion side of the minor cutting edge is the other end side. Therefore, in a case where the minor cutting edge is used for cutting, with respect to the cutting load acting on the arcuate cutting edge portion of the minor cutting edge, the strength of the cutting insert can be secured on the other end side where the width of the narrow width portion becomes narrower, and the displacement of the cutting insert along the arcuate cutting edge portion of the main cutting edge not used for cutting can be reliably prevented on one end side of the narrow width portion which is wide away from the arcuate cutting edge portion of the main cutting edge.

Accordingly, in this case, the groove portion may be opened in the flank face connected to the arcuate cutting edge portion of the minor cutting edge. In addition, it is preferable that the arcuate cutting edge portion of the minor cutting edge is formed in a convex curved shape in such a way that the arcuate cutting edge portion extends to the seating face side after being extended away from the seating face side as more apart from the linear cutting edge portion of the minor cutting edge. Accordingly, since the arcuate cutting edge portion of the minor cutting edge gradually cuts into a workpiece from the rotationally most projecting point, which is a point most projecting with respect to the seating face, it is possible to reduce the cutting resistance.

That is, in the cutting insert to be used in the indexable ball end mill, during the cutting operating, a large cutting load is applied to the tip end portion of the arcuate cutting edge portion, the flank face connected to the tip end portion, and the side surface of the insert body. Therefore, it is desired to reduce the cutting load and to provide a cutting edge shape considering the chip discharge performance. In the present invention, it is focused on a control of a contact form between the arcuate cutting edge portion and the workpiece.

For example, as a cutting operation method, in a case where contour machining is selected for machining with a tool locus approaching a workpiece shape by pick feed set for each predetermined axial depth, it is preferable to set the tip end side of the cutting edge where the chip thickness becomes thinner as a region where the cutting edge bites the workpiece. In this case, since by forming the arcuate cutting edge portion into the convex curved shape as described above, it is possible to reduce the impact acting on the cutting edge by adopting a twisted shape, the cutting edge shape is more preferable.

On the other hand, as a cutting operation method, in a case where machining along a plane (scanning line machining) in which cutting operating is performed with the tool locus along a surface of a specific workpiece of a three-dimensional shape is selected, when cutting in the axial direction of the end mill main body is performed, since the end mill main body bites into the workpiece from the tip end portion side of the arcuate cutting edge portion where the chip thickness increases, a large cutting load is applied to the tip end portion. By increasing the thickness of the cutting insert by providing the above-described rotationally most projecting point with the arcuate cutting edge portion as a convex curved shape, it is possible to improve the cutting edge strength.

However, in the case where the groove portion opens in the flank face connected to the arcuate cutting edge portion of the minor cutting edge and the arcuate cutting edge portion of the minor cutting edge is formed in a convex curved shape as described above, it is preferable that the opening portion of the groove portion to the flank face is positioned closer to the linear cutting edge portion side of the minor cutting edge than the rotationally most projecting point of the arcuate cutting edge portion of the minor cutting edge. Accordingly, it is possible to prevent the cutting insert from being damaged from the opening portion of the groove portion by the impact caused when the arcuate cutting edge portion of the minor cutting edge bites into the workpiece and cuts from the rotationally most projecting point.

Specifically, it is preferable that in the bottom view when viewed from the direction opposing the seating face, a first intersecting angle formed by a straight line connecting the rotationally most projecting point and a center of the arcuate cutting edge portion of the minor cutting edge and a straight line connecting the end portion toward the seating face side of the intersecting ridgeline portion between a wall surface of the groove portion directed toward the linear cutting edge portion side of the minor cutting edge and the flank face and the center of the arcuate cutting edge portion of the minor cutting edge is in a range of 5° to 60°.

If the first intersecting angle is too small to be less than 5°, there is a possibility that the opening portion of the groove portion is too close to the rotationally most projecting point and the cutting insert is damaged when the arcuate cutting edge portion of the minor cutting edge bites. On the other hand, if the first intersecting angle is larger than 60°, in a case where the cutting insert is attached by inserting a clamp screw through a mounting hole formed in the cutting insert and screwing it into a screw hole of the insert mounting seat, the groove portion or the projection portion may interfere with the mounting hole or the screw hole.

In addition, similarly, as described above, it is preferable that in a case where the groove portion opens on the flank face connected to the arcuate cutting edge portion of the minor cutting edge and the arcuate cutting edge portion of the minor cutting edge is formed in a convex curved shape, in the bottom view when viewed from the direction opposing the seating face, a second intersecting angle formed by a straight line connecting the rotationally most projecting point and the center of the arcuate cutting edge portion of the minor cutting edge and an extended line of a linear cutting edge portion of the minor cutting edge toward the arcuate cutting edge portion side of the minor cutting edge is in a range of 10° to 50°.

If this second intersecting angle is too small to be less than 10°, in a case where the minor cutting edge is used for cutting, the rotationally most projecting point is too close to the axis of the end mill main body, and the arcuate cutting edge portion of the minor cutting edge cuts into the workpiece from the portion where a rotational speed around the axis is small. Therefore, an effect of reducing the cutting resistance may be impaired. On the other hand, if the second intersecting angle is large enough to exceed 50°, as described above, when the opening portion of the groove portion is intended to be positioned on the linear cutting edge portion side of the minor cutting edge with respect to the rotationally most projecting point on the flank face connected to the arcuate cutting edge portion of the minor cutting edge, there is a possibility that the groove portion or the projection portion interferes with the mounting hole of the cutting insert or the screw hole of the insert mounting seat. Furthermore, if the second intersecting angle θ2 is larger than 50°, since the region where an axial rake angle of the arcuate cutting edge portion takes a negative value increases, the discharge performance of the chip tends to deteriorate.

The groove portion may not be opened in at least one of the flank face on the one end side and the flank face on the other end side in the direction in which the groove portion extends. In this case, even if the arcuate cutting edge portion of the minor cutting edge is formed in the convex curved shape as described above, there is little possibility of damage if the groove portion is free of an opening in the flank face.

Furthermore, the groove portion may have a constant groove width in at least one of the one end side and the other end side with respect to the narrow width portion. That is, the groove portion may have a narrow width portion in which the groove width becomes narrower from the one end side to the other end side partially in the direction in which the groove portion extends. For example, if the groove width of the groove portion is made constant on the other end side than the narrow width portion where the groove width is narrowed on the other end side, it is possible to more reliably secure the mounting rigidity by suppressing the width of the projection portion from becoming too narrow at this portion.

Furthermore, it is preferable that a groove width at the other end of the narrow width portion in the groove portion is set to be in a range of 0.05×r to 0.18×r with respect to a radius r of the arcuate cutting edge portion of the cutting edge positioned at the other end side of the groove portion. If the groove width at the other end which is the narrowest at the narrow width portion is narrow enough to be smaller than the above range, the width of the projection portion of the insert mounting seat may also be reduced, and it may be difficult to reliably secure rigidity. On the other hand, when the groove width at the other end of the narrow width portion is so wide as to exceed the above range and the wall surfaces of the groove portion are close to each other in parallel state, by securing the thickness at the other end side of the narrow width portion, there is a possibility that the strength of the cutting insert cannot be maintained by being dispersed the stress.

Advantageous Effects of Invention

As described above, according to the present invention, by the narrow width portion of the groove portion formed on the seating face of the cutting insert, on the other end side in the direction in which the groove portion in which the groove width becomes narrower extends, since the thickness of the cutting insert is secured and the stress is dispersed, it is possible to improve the strength and it is possible to prevent the cutting insert from being damaged by the load during the cutting operating. On the other hand, since the groove width of the narrow width portion is wider on one end side in the direction in which the groove portion extends, the projection portion of the indexable ball end mill can be formed to be wide and it is possible to enhance the mounting rigidity of the cutting insert and reliably prevent the displacement.

DESCRIPTION OF EMBODIMENTS

FIGS. 1 to 7 illustrate a cutting insert 1 according to a first embodiment of the present invention. In addition, FIGS. 8 to 13 illustrate a tip end portion of an end mill main body 11 of an indexable ball end mill to which the cutting insert 1 of the first embodiment is detachably attached, and FIGS. 14 to 19 illustrate a tip end portion of an embodiment of the indexable ball end mill of the present invention in which the cutting insert 1 of the first embodiment is detachably attached to an insert mounting seat 12 of the end mill main body 11.

Figure 1:
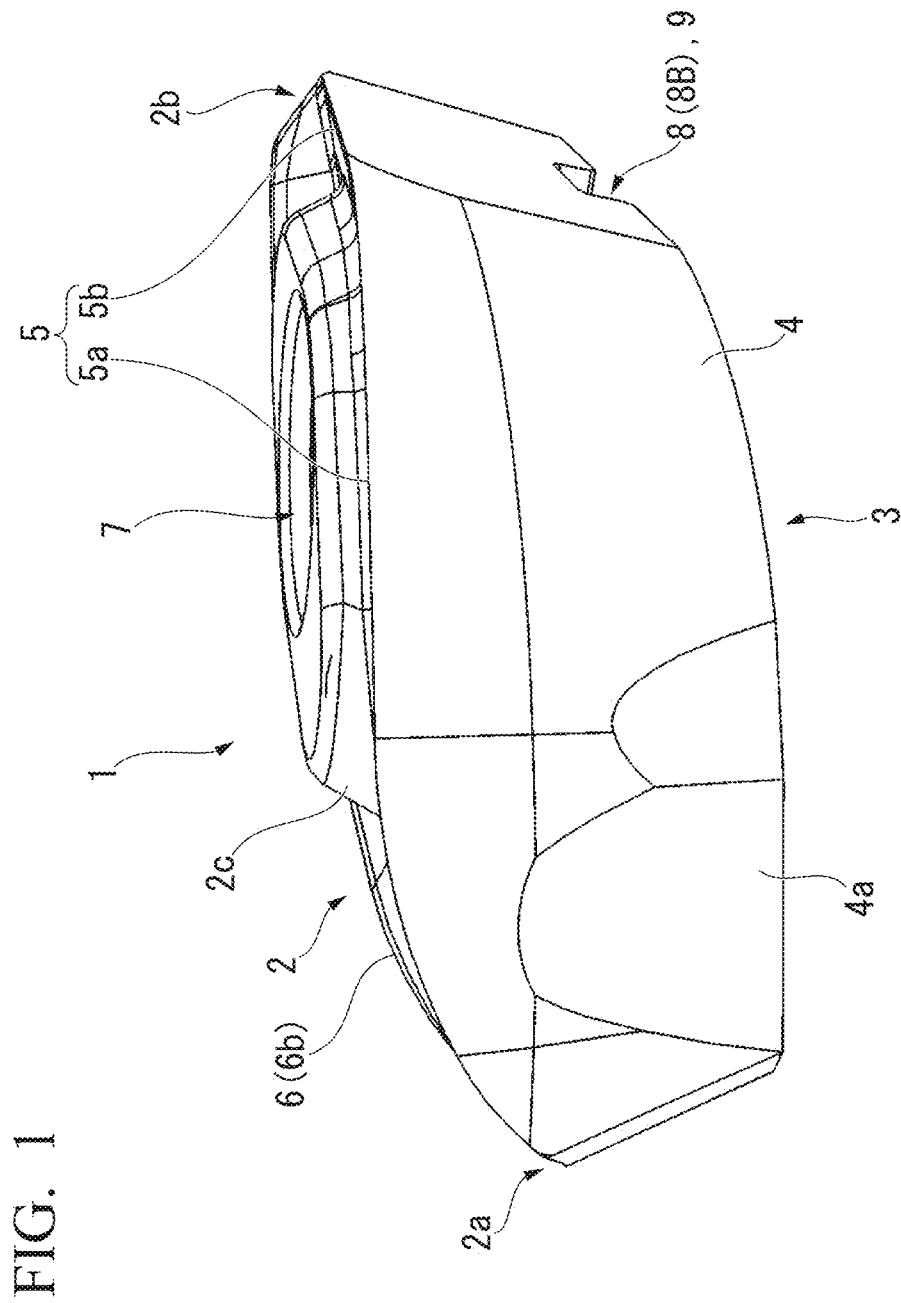
FIG. 1 is a perspective view illustrating a first embodiment of a cutting insert of the present invention.
Figure 2:
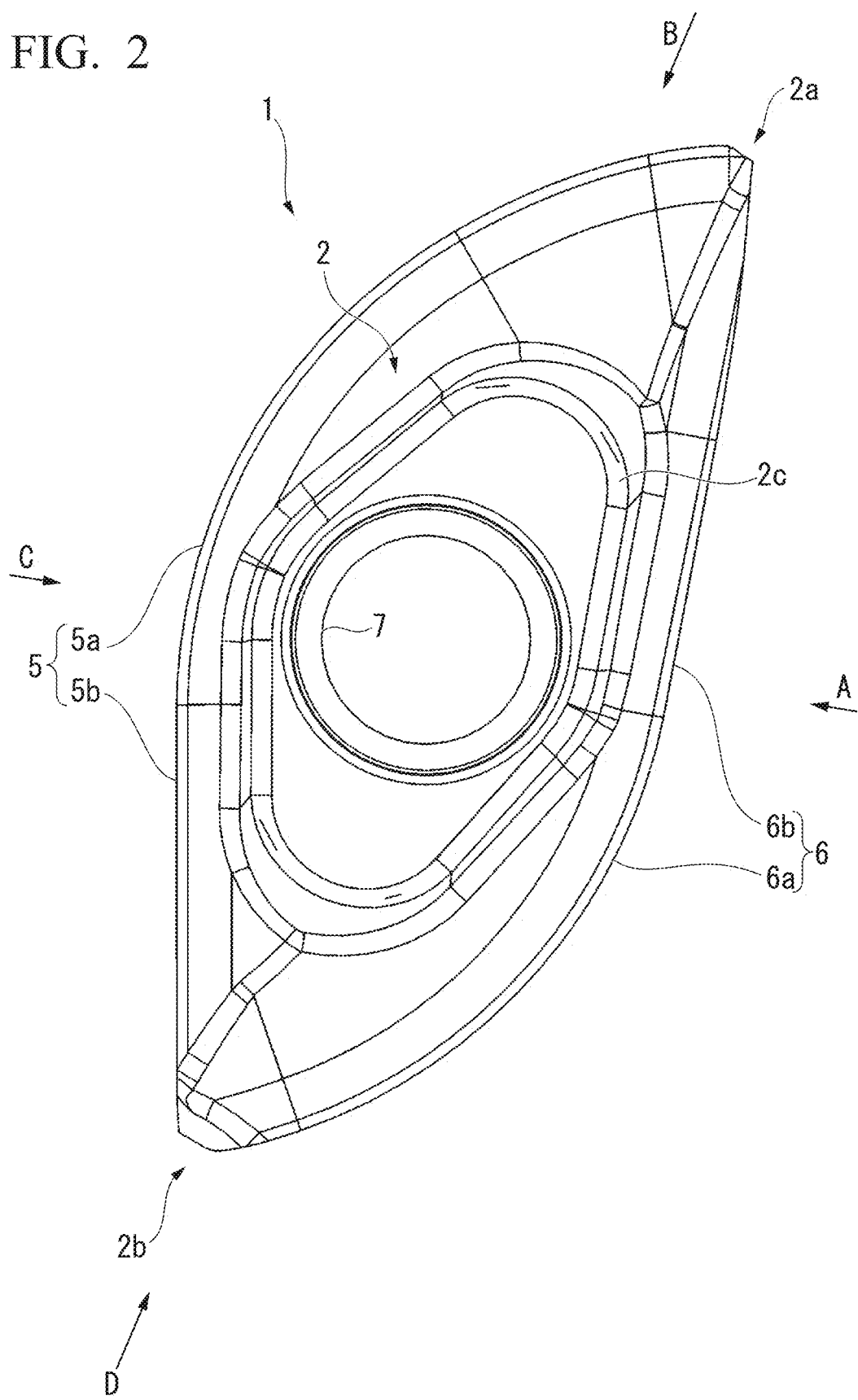
FIG. 2 is a plan view of the embodiment illustrated in FIG. 1.

The cutting insert 1 of the present embodiment is formed of a hard material such as cemented carbide and has a leaf shaped leaf shape as illustrated in FIG. 2 in a plan view, and the upper surface thereof is defined as a leaf-shaped rake face 2 as described above. In addition, the lower surface facing the opposite side to the rake face 2 has a leaf shape of leaves of a roughly similar shape to the rake face 2 and is a flat seating face 3 seated on the bottom surface of the insert mounting seat and a side surface extending to the periphery between the rake face 2 and the seating face 3 is a flank face 4.

In an intersecting ridgeline between the rake face 2 and the flank face 4, two cutting edges each having arcuate cutting edge portions 5a and 6a extending in an arc shape as illustrated in FIG. 2 in plan view when viewed from a direction opposed to the rake face 2 and linear cutting edge portions 5b and 6b extending so as to be in contact with the arcuate cutting edge portion 5a and 6a are formed by alternately positioning the arcuate cutting edge portions 5a and 6a and the linear cutting edge portions 5b and 6b in the circumferential direction of the rake face 2. One first cutting edge among two cutting edges is a main cutting edge 5 and the other second cutting edge is a minor cutting edge 6.

In addition, the flank face 4 is inclined so as to head toward the inner periphery side of the cutting insert 1 as going from the rake face 2 to the seating face 3 side and the cutting insert 1 of the present embodiment is a positive type cutting insert. Further, in the center part of the rake face 2 and the seating face 3, a mounting hole 7 having a circular cross section formed so as to penetrate through the cutting insert 1 is opened, and a portion on the rake face 2 side of the mounting hole 7 and is formed so as to decrease in diameter toward the seating face 3 side.

Here, in the plan view, the arcuate cutting edge portion 5a of the main cutting edge 5 has a substantially quarter circular arc shape. On the other hand, the arcuate cutting edge portion 6a of the minor cutting edge 6 has the same radius as the arcuate cutting edge portion 5a of the main cutting edge 5. However, the circumferential length is the arcuate cutting edge of the main cutting edge 5 is shorter than the arcuate cutting edge portion 5a, that is, it is formed in an arc shape shorter than a quarter circular arc. In addition, according to this, the linear cutting edge portion 5b of the main cutting edge 5 is conversely shorter than the linear cutting edge portion 6b of the minor cutting edge 6. That is, the cutting insert 1 of the present embodiment is not rotationally symmetrical by 180° around the center line of the mounting hole 7, and is asymmetric.

The linear cutting edge portions 5b and 6b of the main cutting edge 5 and the minor cutting edge 6 extend so as to approach each other as going from a first end portion 2a of the rake face 2 where the arcuate cutting edge portion 5a of the main cutting edge 5 and the linear cutting edge portion 6b of the minor cutting edge 6 intersect in the above-described plan view toward a second end portion 2b of the rake face 2 where the linear cutting edge portion 5b of the main cutting edge 5 and the arcuate cutting edge portion 6a of the minor cutting edge 6 intersect. In addition, the first and second end portions 2a and 2b are chamfered at an obtuse angle to the arcuate cutting edge portions 5a and 6a and the linear cutting edge portions 5b and 6b of the main cutting edge 5 and the minor cutting edge 6. The first end portion 2a is positioned closer to the seating face 3 than the second end portion 2b.

Figure 4:
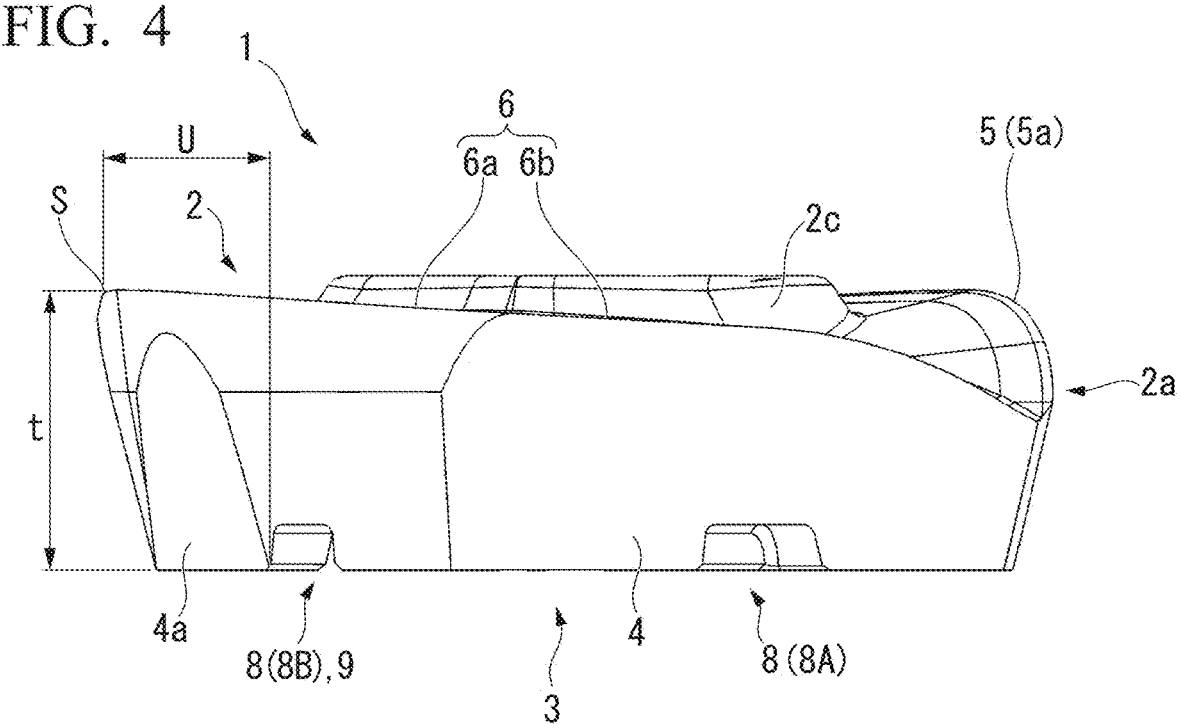
FIG. 4 is a side view as viewed in a direction of an arrow A in FIGS. 2 and 3.
Figure 5:
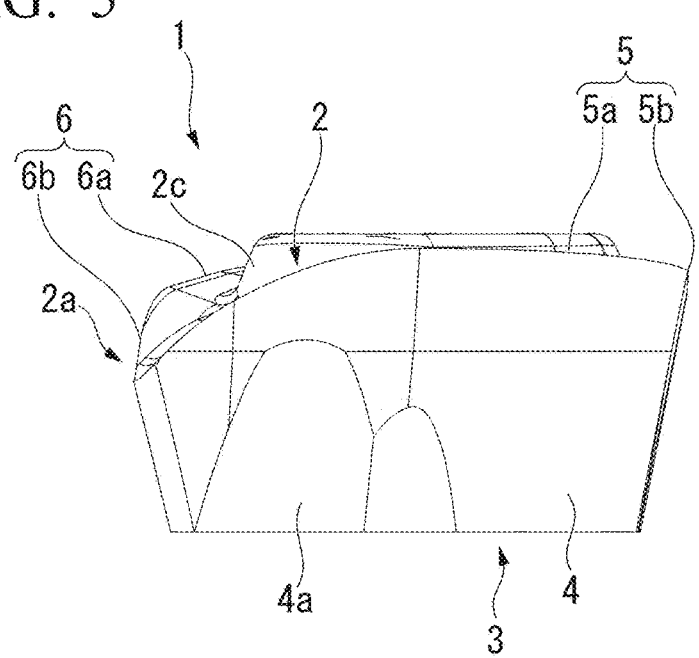
FIG. 5 is a side view as viewed in a direction of an arrow B in FIGS. 2 and 3.
Figure 6:
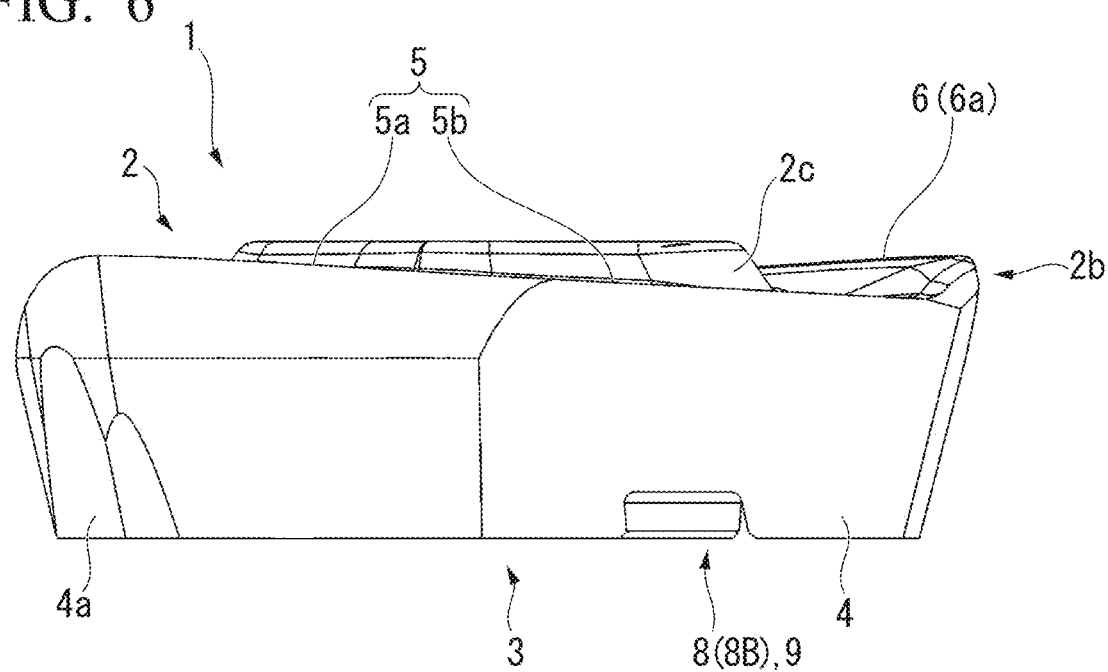
FIG. 6 is a side view as viewed in a direction of an arrow C in FIGS. 2 and 3.
Figure 7:
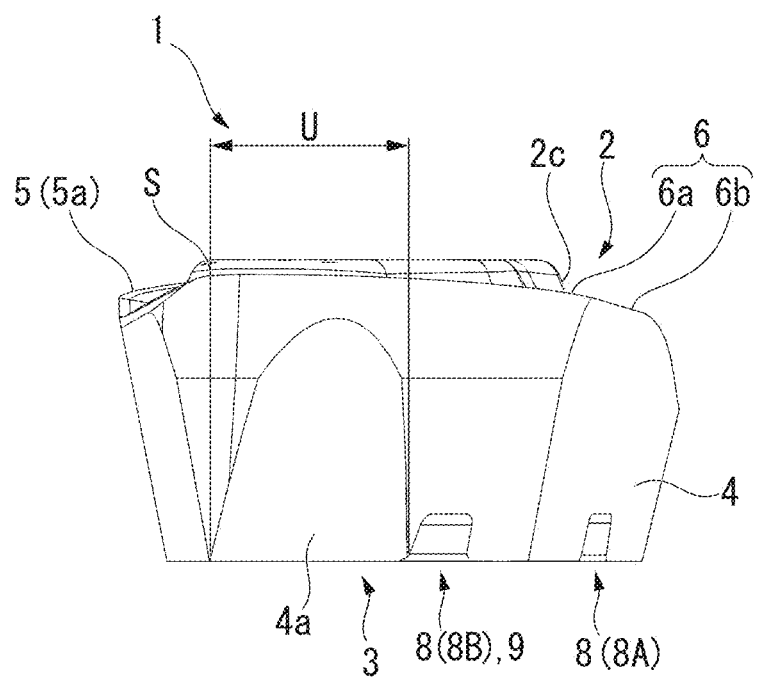
FIG. 7 is a side view as viewed in a direction of an arrow D in FIGS. 2 and 3.
Figure 8:
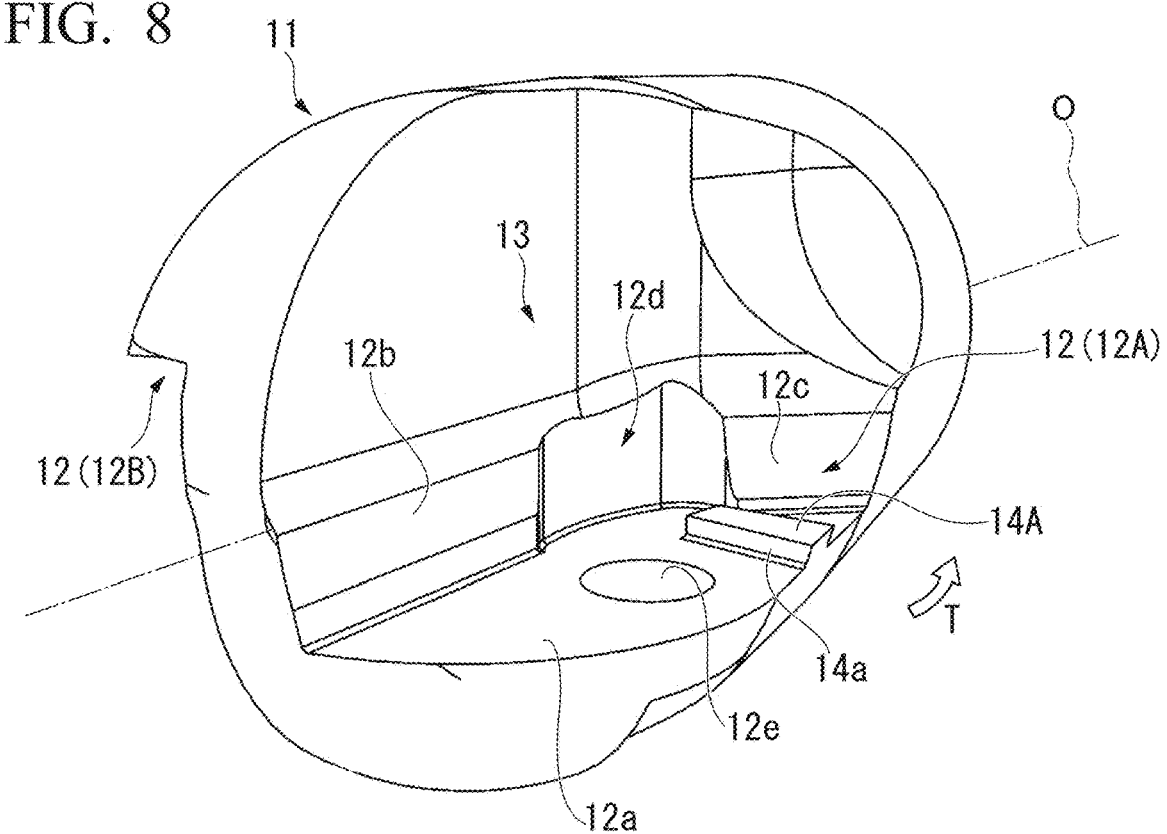
FIG. 8 is a perspective view illustrating a tip end portion of an end mill main body in an embodiment of an indexable ball end mill of the present invention.

Further, the arcuate cutting edge portions 5a and 6a of the main cutting edge 5 and the minor cutting edge 6 are formed in a convex curved shape which approaches the seating face 3 side after separating from the seating face 3 side as they are away from the respective linear cutting edge portions 5b and 6b and among them, a point (the most protruding point most protruding from the seating face 3) at which the convex curve formed by the arcuate cutting edge portion 6a of the minor cutting edge 6 is most distant from and apart from the seating face 3 becomes the rotationally most projecting point S of the arcuate cutting edge portion 6a of the minor cutting edge 6. The linear cutting edge portions 5b and 6b of the main cutting edge 5 and the minor cutting edge 6 extend, as seen from the direction opposing the flank face 4, as illustrated in FIGS. 4 and 6, in a substantially straight line which is in contact with the convex curve formed by the arcuate cutting edge portions 5a and 6a and approaches the seating face 3 side as it goes away from the arcuate cutting edge portions 5a and 6a.

In addition, a protrusion 2c which is protruded in a direction away from the seating face 3 rather than the main cutting edge 5 and the minor cutting edge 6 and has a substantially elliptical shape in plan view is formed around an opening portion of the mounting hole 7 in the central portion of the rake face 2. An upper end surface of the protrusion 2c is a flat surface parallel to the seating face 3, and the mounting hole 7 is opened in the upper end surface of the protrusion 2c. Further, the outer peripheral surface of the protrusion 2c is inclined so as to head toward the inside of the rake face 2 as going toward the upper end surface side. In addition, the rake face 2 extends away from the main cutting edge 5 and the minor cutting edge 6 toward the seating face 3 toward the inside of the rake face 2 and then forms a concavely curved face and is connected to the outer peripheral surface of the protrusion 2c.

Furthermore, the flank face 4 connected to the linear cutting edge portions 5b and 6b of the main cutting edge 5 and the minor cutting edge 6 is formed in a planar shape inclined as described above. On the other hand, the flank face 4 connected to the arcuate cutting edge portions 5a and 6a of the main cutting edge 5 and the minor cutting edge 6 is curved along the arcuate cutting edge portions 5a and 6a on the rake face 2 side in the circumferential direction of the cutting insert 1. However, on the side of the seating face 3, a flat surface portion 4a is inclined as described above and is cut out in a planar shape.

Figure 3:
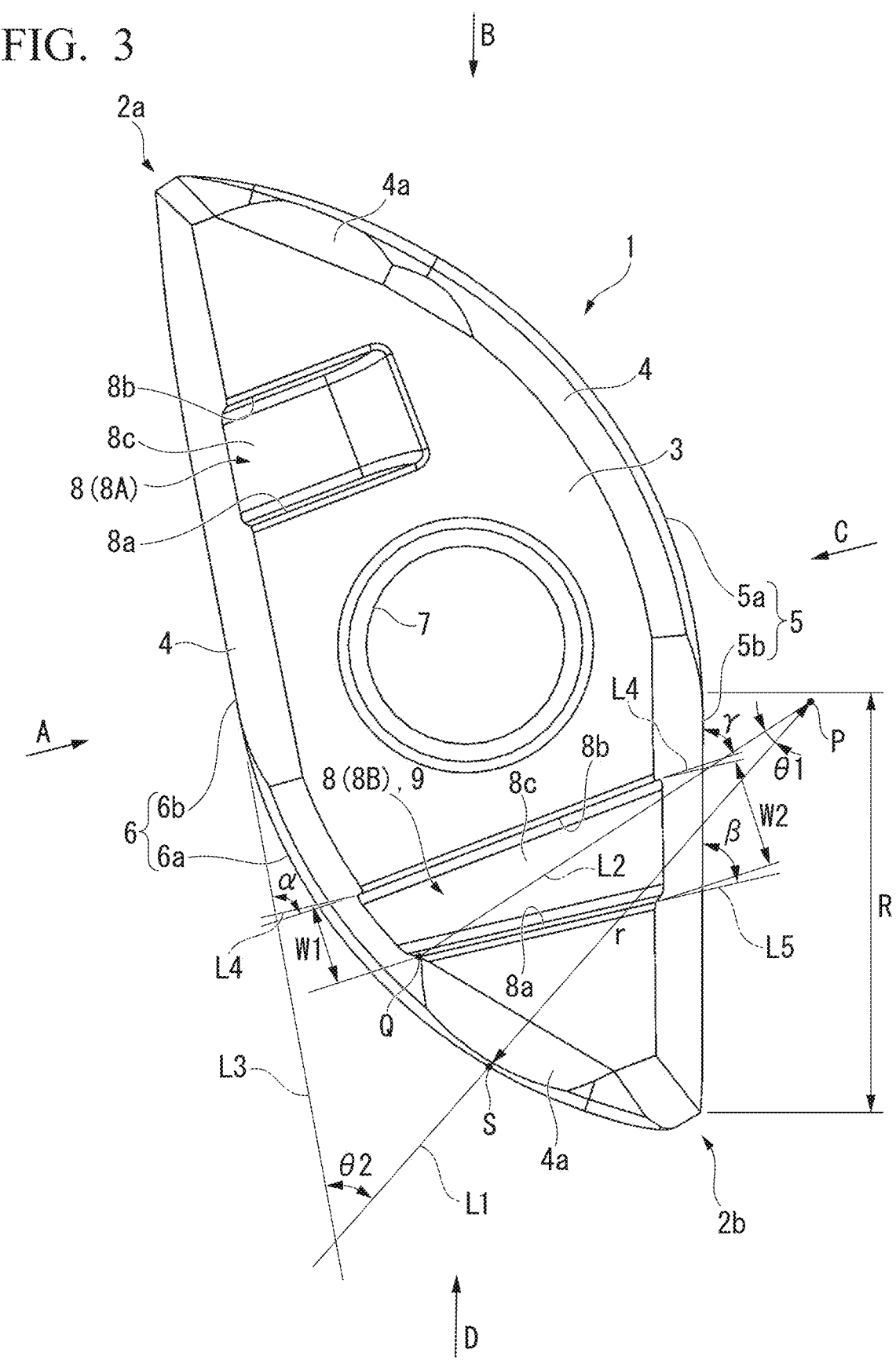
FIG. 3 is a bottom view of the embodiment illustrated in FIG. 1.

As illustrated in FIG. 3, a groove portion 8 is formed on the seating face 3. Here, in the present embodiment, in a bottom view as seen from a direction perpendicularly facing the seating face 3, as illustrated in FIG. 3, two first and second groove portions 8A and 8B are formed on opposite sides with the opening portion being spaced apart from the opening portion of the mounting hole 7 in the seating face 3. The first groove portion 8A is formed on the first end portion 2a side of the rake face 2 rather than the opening portion of the mounting hole 7 and the second groove portion 8B is formed on the second end portion 2b side of the rake face 2.

A cross section orthogonal to the direction in which the groove portion 8 extends is formed in a substantially rectangular shape which is flattened in a direction in which the mounting hole 7 extends, that is, these groove portions 8 include two first and second wall surfaces 8a and 8b extending in a direction substantially perpendicular to the seating face 3 and facing each other and a bottom surface 8c parallel to the seating face 3 extending between the first and second wall surfaces 8a and 8b, respectively. The first wall surface 8a of each groove portion 8 faces the first end portion 2a side of the rake face 2 and the second wall surface 8b faces the second end portion 2b side of the rake face 2. The intersecting ridgeline between the first and second wall surfaces 8a and 8b and the seating face 3 is chamfered by the convex curved surface, and the corner portions where the first and second wall surfaces 8a and 8b and the bottom surface 8c cross each other is concave and is formed in a curved surface shape.

In addition, the first groove portion 8A opens to the flank face 4 connected to the linear cutting edge portion 6b of the minor cutting edge 6 and is formed in the shape of a notch groove which is free of an opening to the flank face 4 connected to the arcuate cutting edge portion 5a of the main cutting edge 5. An end portion of the main cutting edge 5 on the arcuate cutting edge portion 5a side in the first groove portion 8A is continued to the seating face 3 so as to form a concave curved surface from the bottom surface 8c. Further, in the first groove portion 8A, the first and second wall surfaces 8a and 8b extend parallel to each other in the bottom view, that is, the groove width of the first groove portion 8A is constant. The end portion of the main cutting edge 5 on the arcuate cutting edge portion 5a side in the first groove portion 8A extends so as to be orthogonal to the first and second wall surfaces 8a and 8b and the first groove portion 8A has a substantially rectangular shape as viewed from the direction facing the seating face 3.

On the other hand, in the present embodiment, the second groove portion 8B is formed in a penetrating groove shape which opens to both the flank face 4 connected to the linear cutting edge portion 5b of the main cutting edge 5 and the flank face 4 connected to the arcuate cutting edge portion 6a of the minor cutting edge 6. In the present embodiment, the second groove portion 8B has a narrow width portion 9 in which the groove width narrows from one end side to the other end side in the direction in which the second groove portion 8B extends. Here, in the present embodiment, the flank face 4 side connected to the linear cutting edge portion 5b of the main cutting edge 5 is defined as one end side of the second groove portion 8B and the flank face 4 side connected to the arcuate cutting edge portion 6a of the minor cutting edge 6 is defined as the other end side. Furthermore, as illustrated in FIG. 3, the whole of the second groove portion 8B is the narrow width portion 9. In the narrow width portion 9, in the present embodiment, the rate at which the groove width becomes narrow is constant from one end side to the other end side of the second groove portion 8B, that is, the first and second wall surfaces 8a and 8b of the second groove portion 8B are formed so as to approach each other in a linear shape from the one end side to the other end side in the bottom view.

In addition, the opening portion of the second groove portion 8B to the flank face 4 connected to the arcuate cutting edge portion 6a of the minor cutting edge 6 is positioned closer to the linear cutting edge portion 6b side of the minor cutting edge 6 than the rotationally most projecting point S in which the arcuate cutting edge portion 6a of the minor cutting edge 6 having a convex curved shape in a side view is most convex with respect to the seating face 3. Specifically, in the bottom view, a first intersecting angle θ1 formed by a straight line L1 connecting the rotationally most projecting point S and a center P of the arcuate cutting edge portion 6a of the minor cutting edge 6 and a straight line L2 connecting an end portion Q toward the seating face 3 side of the intersecting ridgeline (excluding chamfer) between the flank face 4 of the first wall surface 8a of the second groove portion 8B directed toward the linear cutting edge portion 6b side of the minor cutting edge 6 and the center P is in a range of 5° to 60°.

Further, in the bottom view, a second intersecting angle θ2 formed by the straight line L1 connecting the most rotationally most projecting point S and the center P of the arcuate cutting edge portion 6a of the minor cutting edge 6 and an extended line L3 of the linear cutting edge portion 6b of the minor cutting edge 6 toward the arcuate cutting edge portion 6a side of the minor cutting edge 6 is in a range of 10° to 50°. A groove width W1 at the other end (the other end of the second groove portion 8B in the present embodiment) of the narrow width portion 9 is set to be in a range of 0.05×r to 0.18×r with respect to a radius r as viewed from the seating face 3 side of the arcuate cutting edge portion (the arcuate cutting edge portion 6a of the cutting edge 6) positioned at the other end side of the groove portion (the second groove portion 8B) having the narrow width portion 9, for example, in a range of 1 mm to 7 mm. However, in FIG. 3, in a case where the shape seen from the seating face 3 side of the arcuate cutting edge portion 6a is deviated from the circular arc, the arc closest to the deviated shape is virtually drawn, and the radius r is obtained from this virtual arc.

Figure 32:
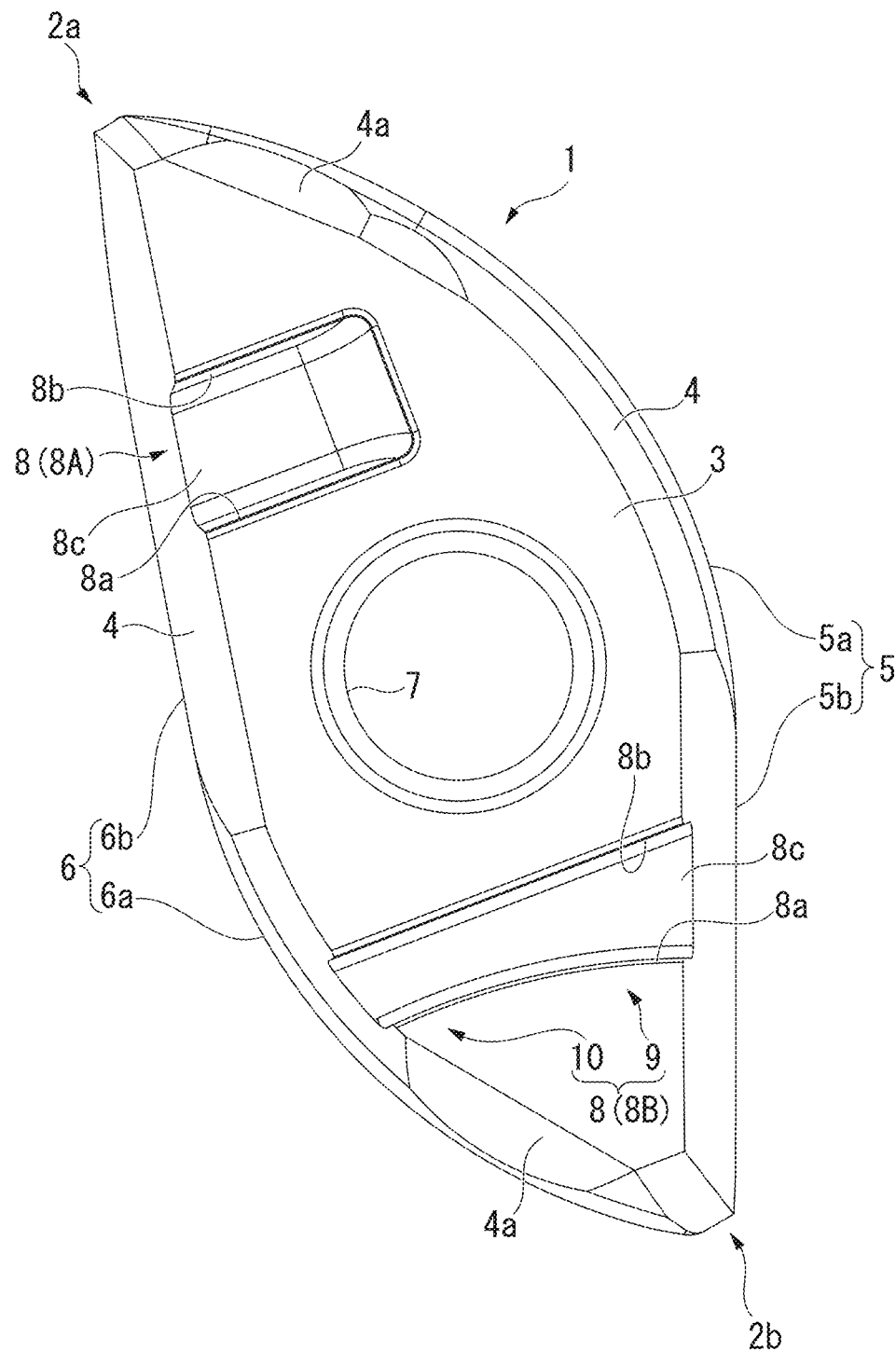
FIG. 32 is a bottom view illustrating a fifth embodiment of the cutting insert of the present invention.

On the other hand, a groove width W2 at one end of the narrow width portion 9 is set to be satisfied an expression W2>W1, is set, as viewed from the seating face 3 side of the arcuate cutting edge portion (the arcuate cutting edge portion 6a of the minor cutting edge 6) positioned on the other end side of the groove portion (the second groove portion 8B) having the narrow width portion 9, in the range of 0.10×r to 0.30×r with respect to the radius r in plan view as viewed from the rake face 2 side, and a length R of the linear cutting edge portion 5b of the main cutting edge 5 in the plan view or the bottom view is in the range of 0.10×R to 0.32×R. In the case where the groove widths W1 and W2 linearly extend in a bottom view as seen from a direction in which the first and second groove wall surfaces 8a and 8b face the seating face 3, these groove widths W1 and W2 are the widths in the direction perpendicular to the bisector of the straight line formed by these first and second groove wall surfaces 8a and 8b, and in a case where one groove wall surface (the first groove wall surface 8a) is curved and the other groove wall surface (the second groove wall surface 8b) is linear as in the fifth embodiment illustrated in FIG. 32, the groove widths W1 and W2 are the widths in the direction perpendicular to the straight groove wall surface.

Furthermore, in the bottom view, a first intersecting angle α formed by a straight line L4 formed by an extension surface toward the other end of the second wall surface 8b of the second groove portion 8B with respect to an extended line L3 of the linear cutting edge portion 6b of the minor cutting edge 6 toward the arcuate cutting edge portion 6a side of the minor cutting edge 6 is in a range of 45° to 90°. Similarly, in the bottom view, an inclination angle β formed by a straight line L5 formed by the extended surface of the first wall surface 8a of the second groove portion 8B with respect to the linear cutting edge portion 5b of the main cutting edge 5 is in a range of 45° to 90°. An inclination angle γ formed by the straight line L4 formed of the extended surface of the second wall surface 8b of the second groove portion 8B with respect to the linear cutting edge portion 5b of the main cutting edge 5 is smaller than the inclination angle β. In the present embodiment, in the bottom view, the first groove portion 8A extends in a direction intersecting with the linear cutting edge portion 6b of the minor cutting edge 6 on the side of the first end portion 2a at an acute angle, and the second groove portion 8B extends in a direction intersecting the linear cutting edge portion 5b of the main cutting edge 5 at an acute angle on the second end portion 2b side.

Here, the cutting insert 1 formed of a hard material such as cemented carbide is manufactured according to the basic process of powder metallurgy technology. That is, in a case where the cutting insert 1 is made of cemented carbide, a granulated powder mainly composed of tungsten carbide powder and cobalt powder is used as a main component, and if necessary, powder press molding using a die is performed using granulated powder granulated with chromium, tantalum or the like as an accessory component. A sintered body to be the cutting insert 1 can be manufactured by sintering the press molded body obtained in such a manner in a sintering furnace controlled to an appropriate atmosphere and temperature for a predetermined time. The basic shape of the cutting insert 1 is reflected by a design of the die and the detailed shape of the cutting insert 1 is obtained by die molding. Further, in order to improve the precision of the cutting tip shape of the cutting insert, grinding processing using a grinding wheel may be performed as needed.

As described above, the cutting insert 1 of the first embodiment is detachably attached to the insert mounting seat 12 formed at the tip end portion of the end mill main body 11 illustrated in FIGS. 8 to 13, and configures one embodiment of the indexable ball end mill of the present invention illustrated in FIGS. 14 to 19. The end mill main body 11 is formed of a metallic material such as a steel material and its posterior end portion is formed as a cylindrical shank portion with an axis O as the center and the tip end portion is formed in a convex hemispherical shape having a center on the axis O. In the indexable ball end mill of the present embodiment, the end mill main body 11 is fed in the direction intersecting the axis O while being rotated in an end mill rotational direction T around the axis O. Therefore, the workpiece is subjected to cutting operating by the cutting insert 1 attached to the insert mounting seat 12.

In the present embodiment, the direction from the shank portion of the end mill main body 11 toward the insert mounting seat 12 in the direction in which the axis O extends is referred to as a tip end side (the left side in FIGS. 10 to 13 and FIGS. 16 to 19) and the direction from the insert mounting seat 12 to the shank portion is referred to as a posterior end side (the right side in FIGS. 10 to 13 and FIGS. 16 to 19). The direction orthogonal to the axis O is referred to as a radial direction. The direction toward the axis O in the radial direction is referred to as an inner peripheral side, and the direction away from the axis O is the outer peripheral side.

Here, in the present embodiment, two tip pockets 13 are formed so as to cut off the outer periphery of the tip end portion of the end mill main body 11, and each of the insert mounting seats 12 is formed on opposite sides with a space in the circumferential direction in the bottom surface of the chip pockets 13 facing the end mill rotation direction T. One kind of first and second cutting inserts 1A and 1B having the same shape and the same size according to the first embodiment are attached to these two insert mounting seats 12, respectively.

These insert mounting seats 12 have a flat bottom surface 12a directed in the end mill rotational direction T, a wall surface 12b on the inner peripheral side of the tip end extending from the bottom surface 12a in the end mill rotational direction T and facing the outer peripheral side of the end mill main body 11, and a wall surface 12c on the outer peripheral side of the posterior end facing the outer peripheral side of the tip end. The wall surfaces 12b and 12c are formed in a planar shape that is inclined to the outside of the insert mounting seat 12 as it goes away from the bottom surface 12 and are formed to be able to abut the flat flank face 4 which is connected to the linear cutting edge portions 5b and 6b of the main cutting edge 5 and the minor cutting edge 6 and the flat surface portion 4a at the seating face 3 side of the flank face 4 which is connected to the arcuate cutting edge portions 5a and 6a in a state where the seating face 3 of the cutting insert 1 is seated on the bottom surface 12a.

In addition, a concave portion 12d recessed so as to avoid contact with the curved flank face 4 of the cutting insert 1 is formed between the wall surfaces 12b and 12c. Further, a screw hole 12e into which a clamp screw (not illustrated) to be inserted into the mounting hole 7 of the cutting insert 1 is formed on the bottom surface 12a. As described above, the center line of the screw hole 12e is slightly eccentric toward the concave portion 12d side from the center line of the mounting hole 7 of the cutting insert 1 in a case where the seating face 3 of the cutting insert 1 is seated on the bottom surface 12a so that the flat flank face 4 connected to the linear cutting edge portions 5b and 6b of the main cutting edge 5 and the minor cutting edge 6 and the arcuate cutting edge with the flat surface portion 4a on the seating face 3 side of the flank face 4 connected to the arcuate cutting edge portions 5a and 6a in contact with the wall surfaces 12b and 12c.

Figure 9:
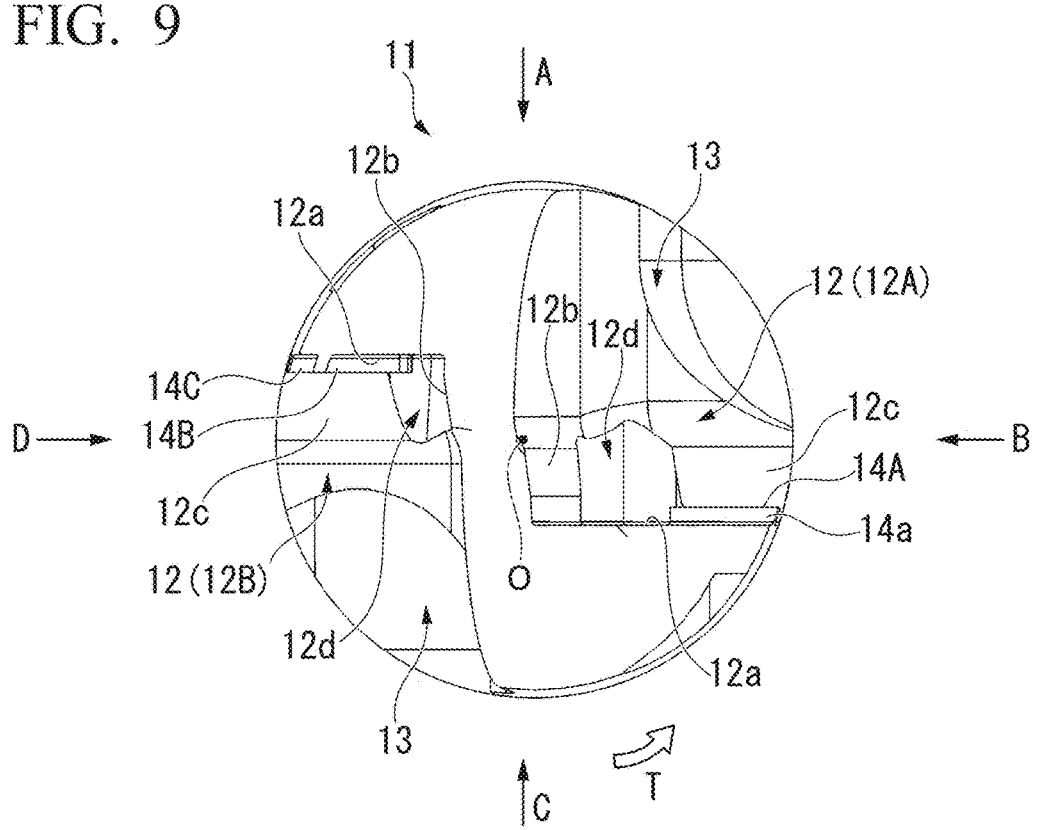
FIG. 9 is a front view of the tip end portion of the end mill main body illustrated in FIG. 8.
Figure 10:
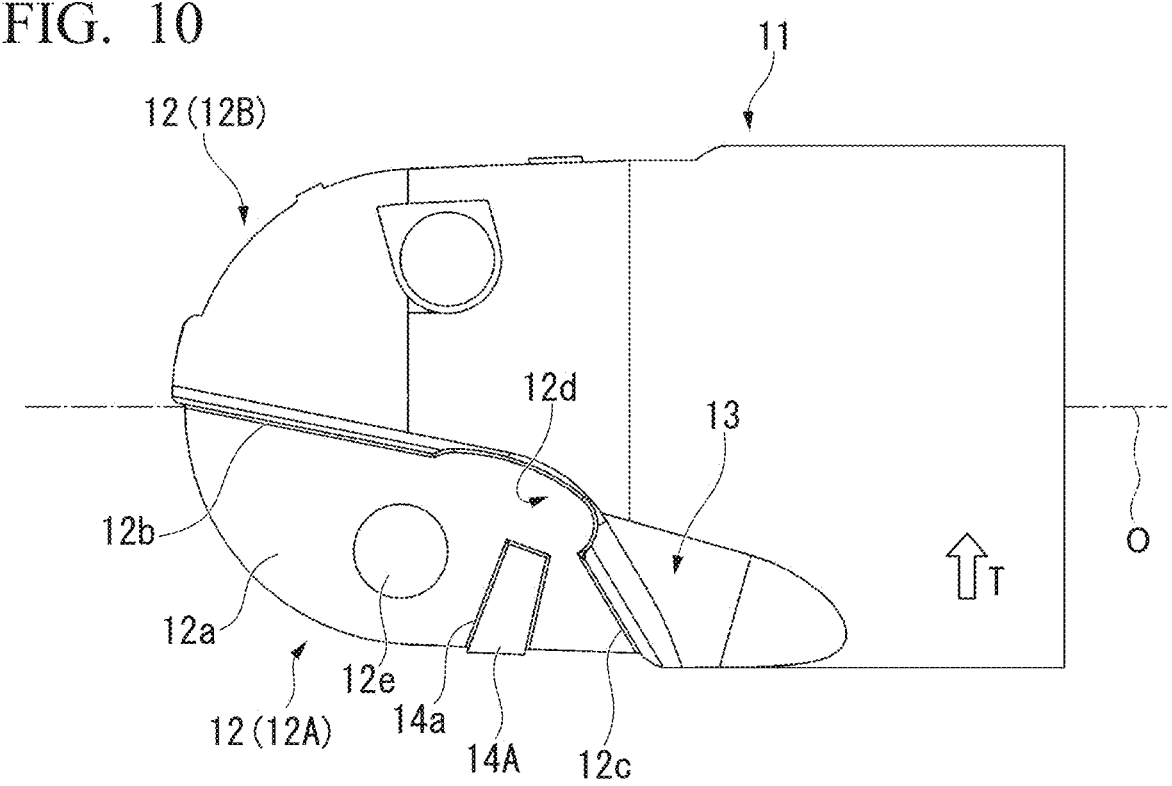
FIG. 10 is a plan view as viewed in a direction of an arrow A in FIG. 9.

As illustrated in FIGS. 9 and 10, a first insert mounting seat 12A of these two insert mounting seats 12 is formed so as to cut away the tip end portion of the end mill main body 11 to the range including the axis O at the tip end side. On the first insert mounting seat 12A, a first cutting insert 1A is positioned on the convex hemisphere extending from the vicinity of the axis O around the arcuate cutting edge portion 5a of the main cutting edge 5 and having the center on the axis O and the linear cutting edge portion 5b of the main cutting edge 5 is mounted so as to be positioned on the cylindrical surface centered on the axis O in contact with the convex hemisphere. Accordingly, the flat flank face 4 connected to the linear cutting edge portion 6b of the minor cutting edge 6 in the first cutting insert 1A is brought into contact with the wall surface 12b of the first insert mounting seat 12A, and the flat surface portion 4a of the flank face 4 of the arcuate cutting edge portion 6a of the minor cutting edge 6 of the first cutting insert 1A is brought into contact with the wall surface 12c of the first insert mounting seat 12A.

On the bottom surface 12a of the first insert mounting seat 12A, the first projection portion 14A capable of contacting the wall surface of the groove portion 8 formed on the seating face 3 of the first cutting insert 1A protrudes between the screw hole 12e and the wall surface 12c and is formed so as to extend from the outer peripheral surface of the tip end portion of the end mill main body 11 toward the concave portion 12d to a position in front of the concave portion 12d with a space from the concave portion 12d. Accordingly, the second groove portion 8B of the groove portion 8 formed on the seating face 3 of the first cutting insert 1A abuts on the first projection portion 14A, and the first insert mounting seat 12A is not formed with a projection portion with which the first groove portion 8A abuts.

Here, the first projection portion 14A has a substantially rectangular shape in which a cross section orthogonal to the direction in which the first projection portion 14A extends is flattened in the end mill rotational direction T, and the entire first projection portion 14A is wider as a whole from the other end side in the direction in which the second groove portion 8B extends toward the one end side (from the inner peripheral side of the end mill main body 11 to the outer peripheral side) with respect to the second groove portion 8B which is the narrow width portion 9. However, the width of the first projection portion 14A (the width in the direction orthogonal to the direction in which the first projection portion 14A extends) is slightly smaller than the width (the width in the direction orthogonal to the direction in which the second groove portion 8B extends) at a position where it abuts on the first projection portion 14A in the direction in which the second groove portion 8B extends and a protrusion height of the first projection portion 14A from the bottom surface 12a is also slightly smaller than a depth of the second groove portion 8B from the seating face 3 of the first cutting insert 1A.

Figure 11:
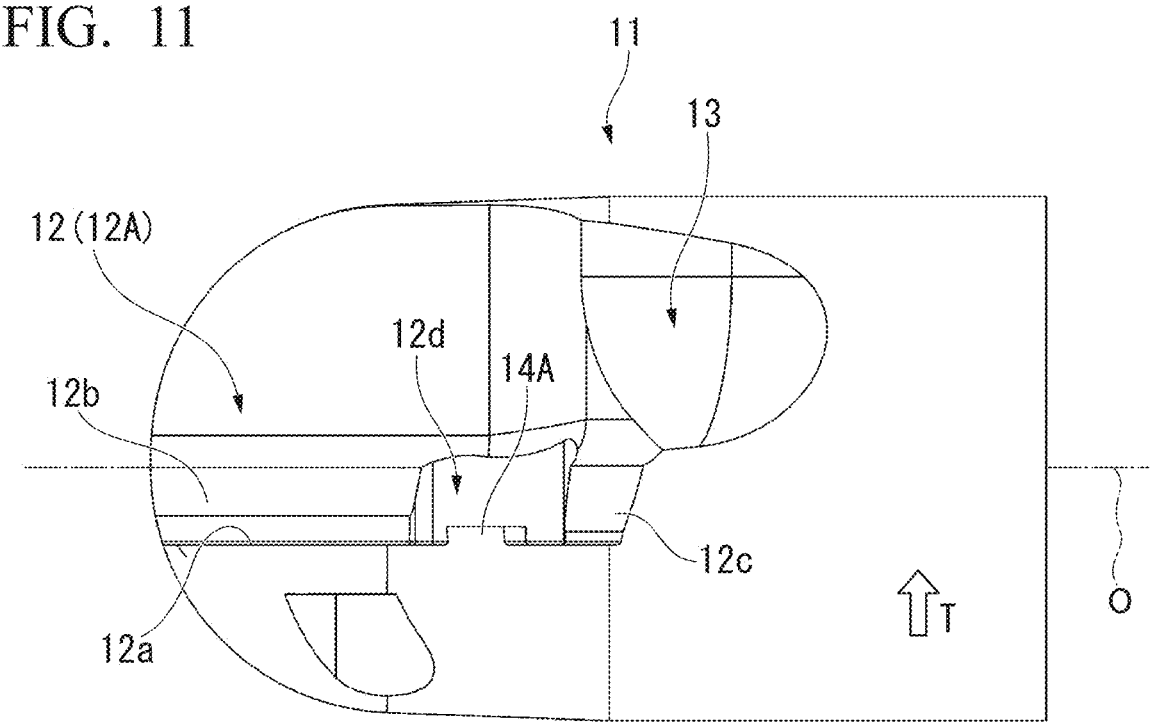
FIG. 11 is a side view as viewed in a direction of an arrow B in FIG. 9.
Figure 12:
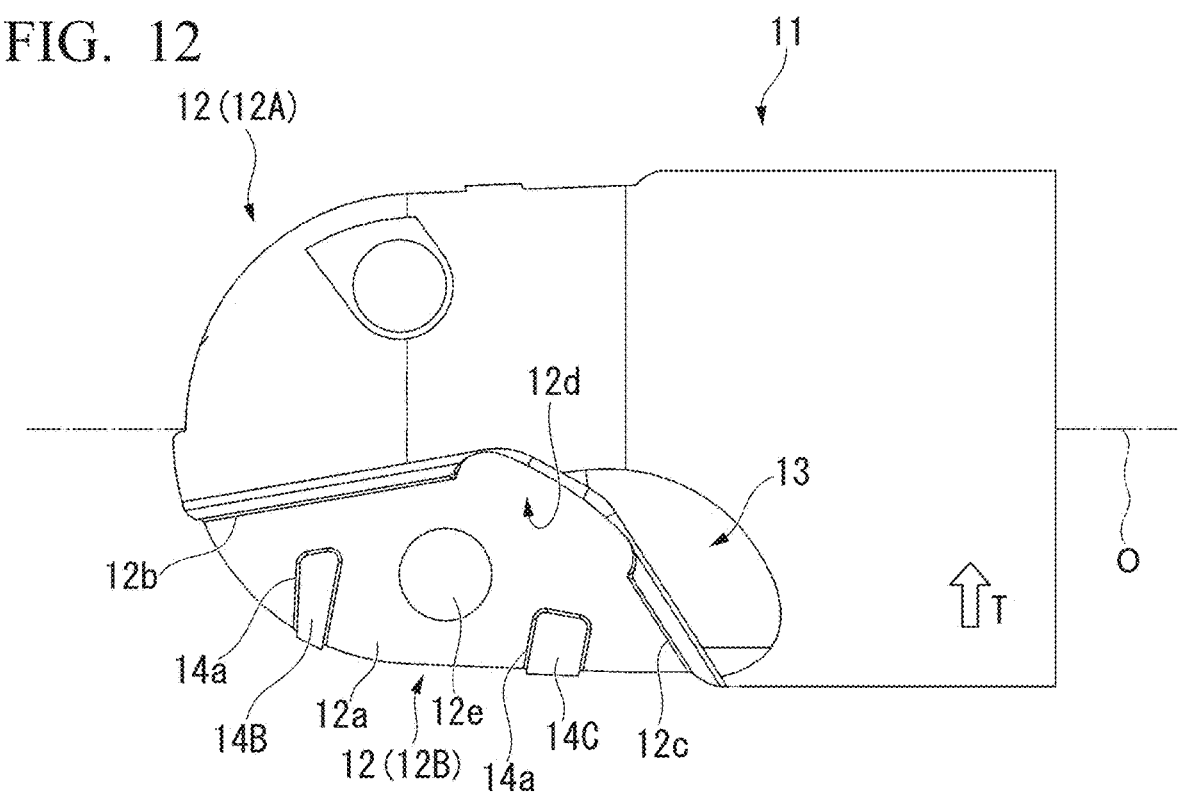
FIG. 12 is a bottom view as viewed in a direction of an arrow C in FIG. 9.
Figure 13:
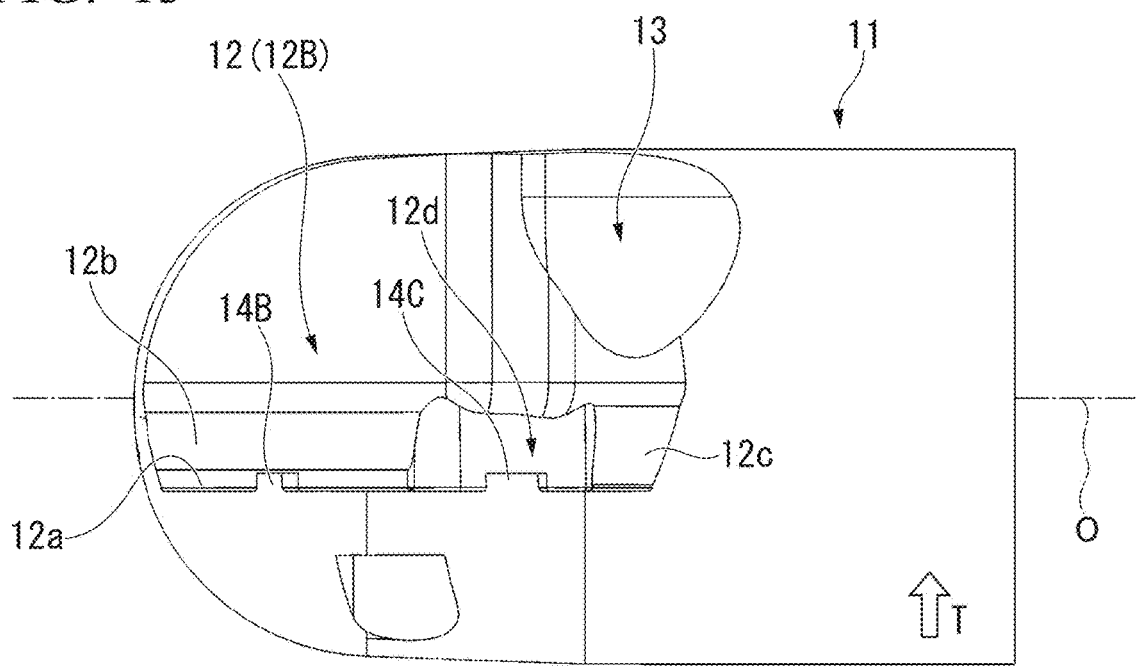
FIG. 13 is a side view as viewed in a direction of an arrow D in FIG. 9.
Figure 14:
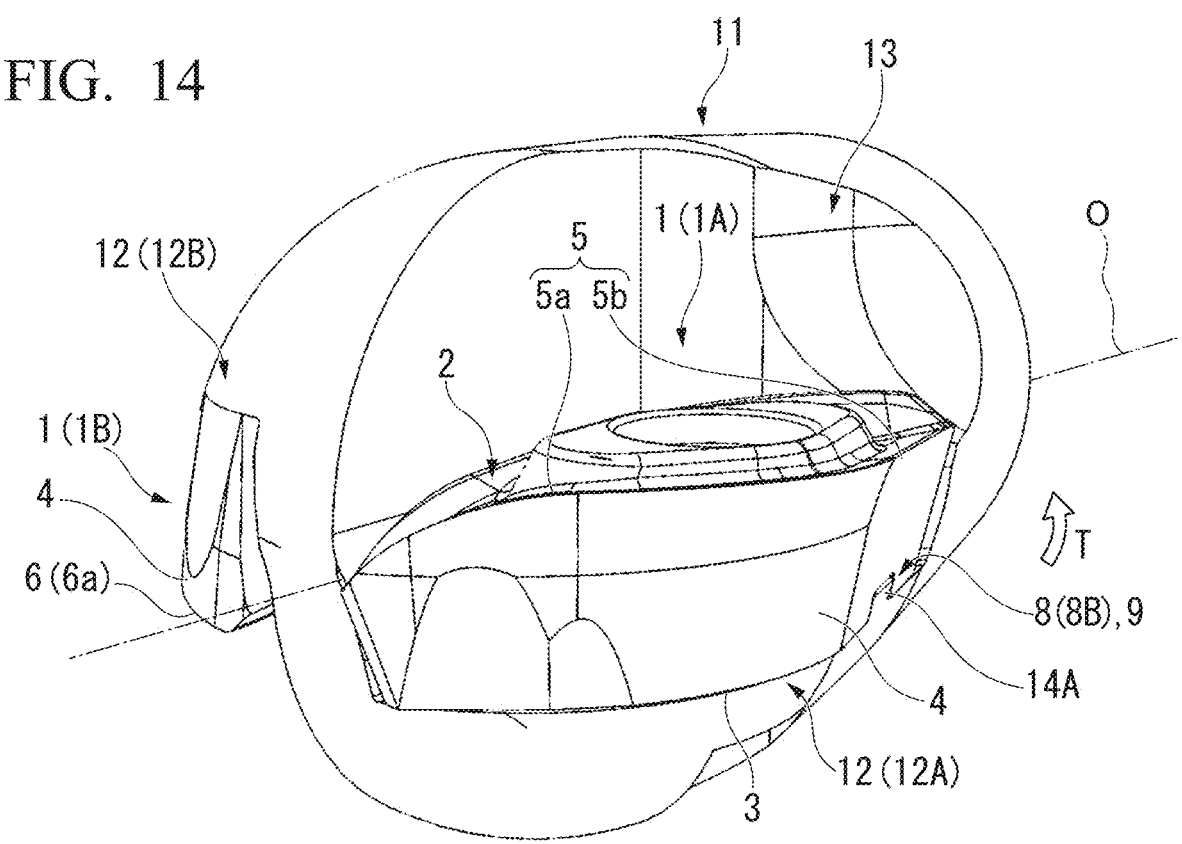
FIG. 14 is a perspective view illustrating the tip end portion of the embodiment of the indexable ball end mill of the present invention.
Figure 15:
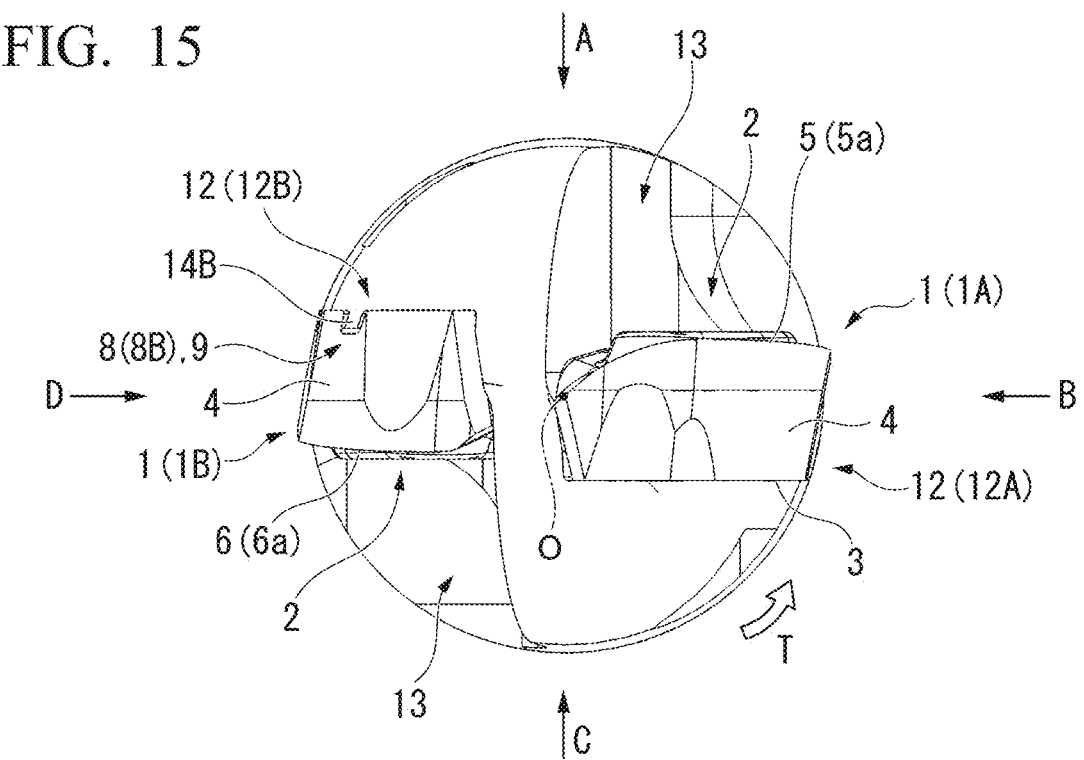
FIG. 15 is a front view of the embodiment illustrated in FIG. 14.
Figure 16:
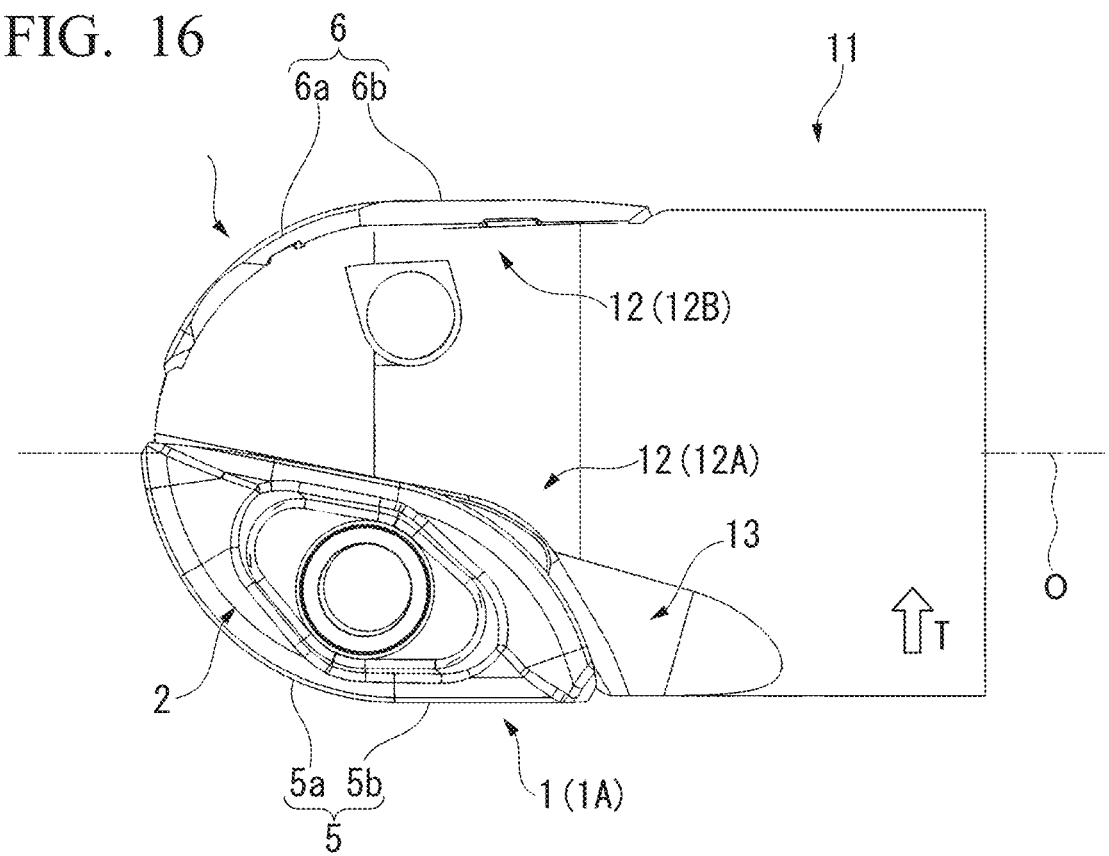
FIG. 16 is a plan view as viewed in a direction of an arrow A in FIG. 15.
Figure 17:
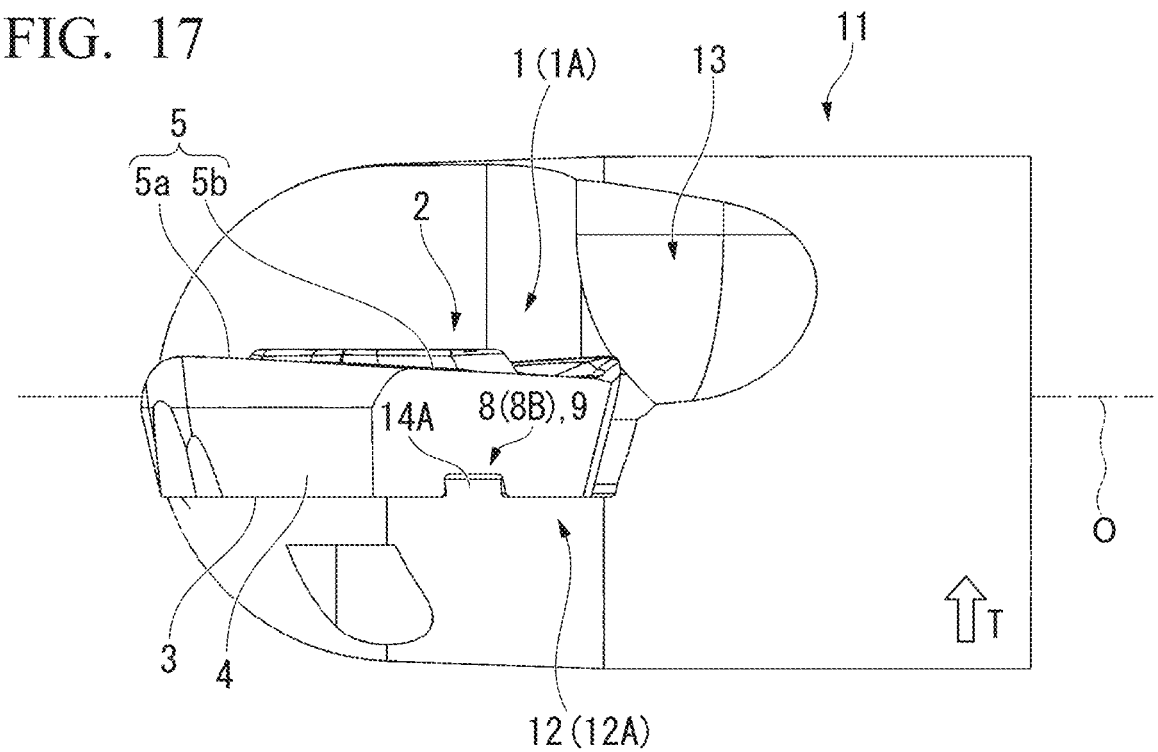
FIG. 17 is a side view as viewed in a direction of an arrow B in FIG. 15.
Figure 18:
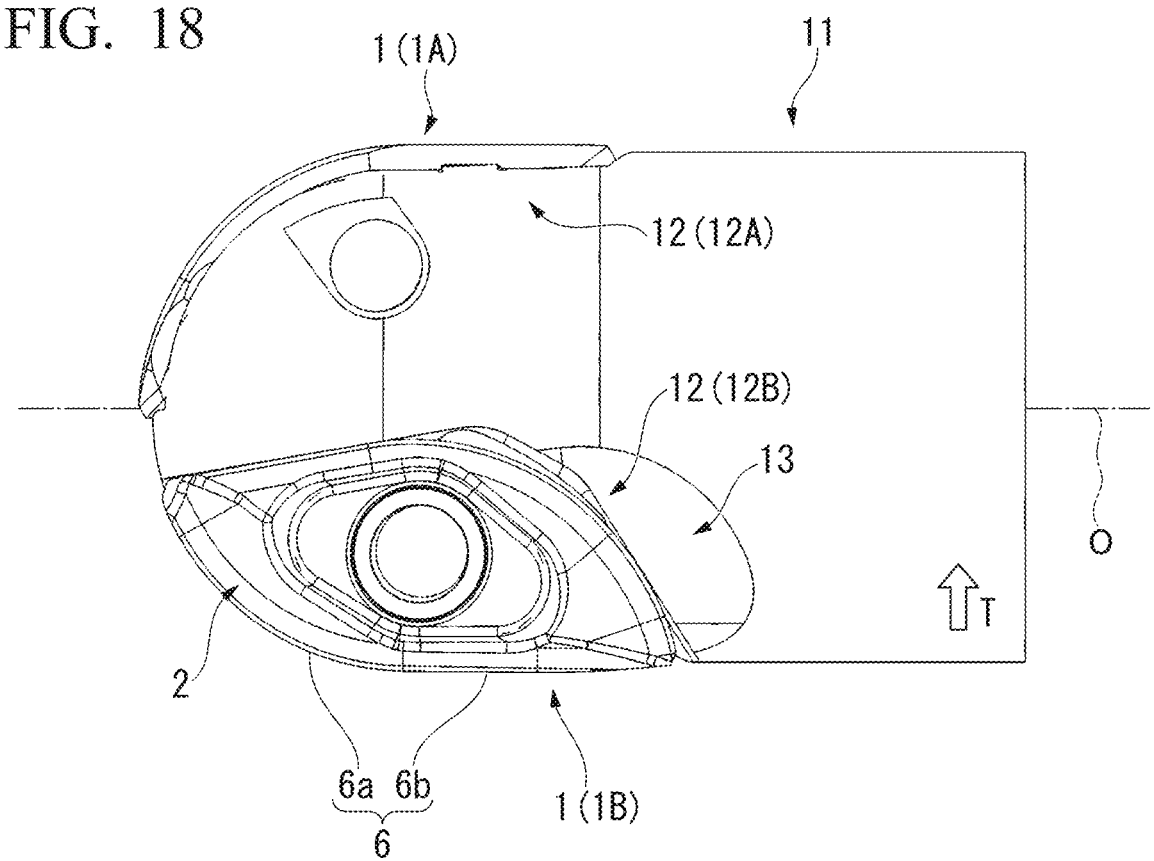
FIG. 18 is a bottom view as viewed in a direction of an arrow C in FIG. 15.
Figure 19:
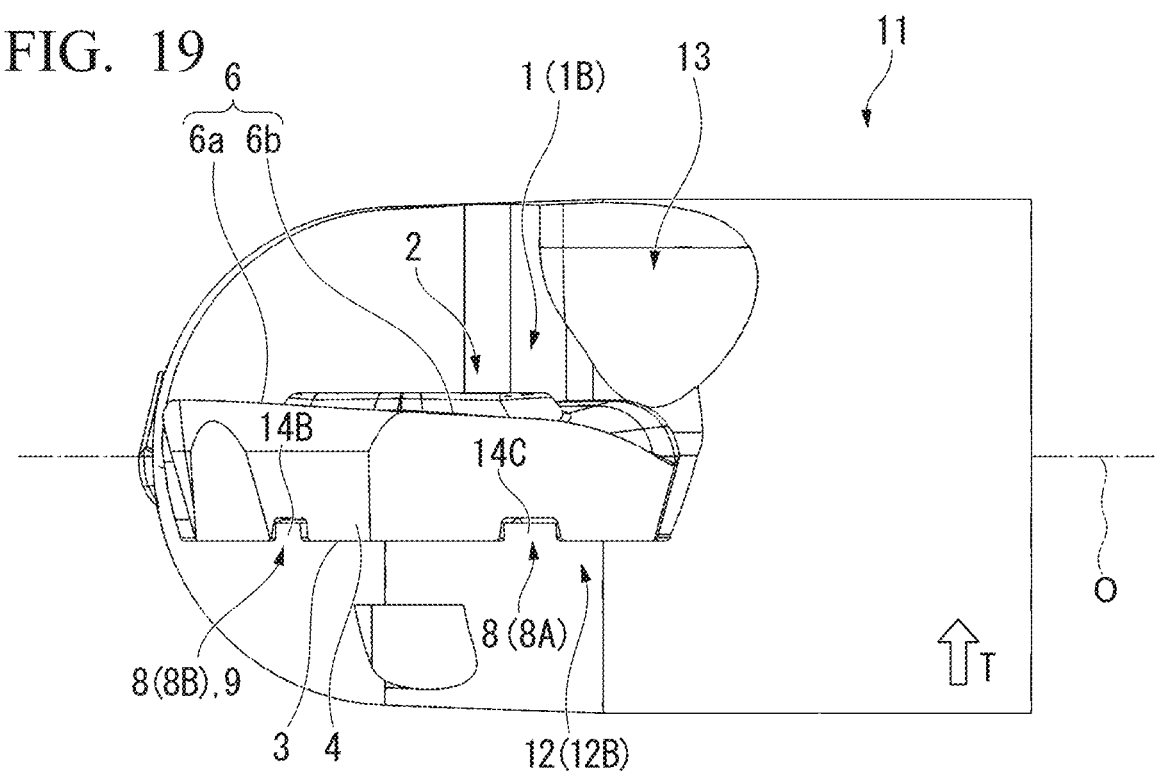
FIG. 19 is a side view as viewed in a direction of an arrow D in FIG. 15.

On the other hand, as illustrated in FIGS. 9 and 11, a second insert mounting seat 12B of the two insert mounting seats 12 is formed at a position slightly away from the axis O to the outer peripheral side on the tip end side of the end mill main body 11. On the second insert mounting seat 12B, a second cutting insert 1B is positioned at a position where the arcuate cutting edge portion 5a of the main cutting edge 5 of the first cutting insert 1A is positioned from a position away from the axis O of the arcuate cutting edge portion 6a of the minor cutting edge 6 and is attached such that the linear cutting edge portion 6b of the minor cutting edge 6 is positioned on the cylindrical surface on which the linear cutting edge portion 5b of the main cutting edge 5 of the first cutting insert 1A is positioned. Accordingly, the flat flank face 4 connected to the linear cutting edge portion 5b of the main cutting edge 5 of the second cutting insert 1B is brought into contact with the wall surface 12b of the second insert mounting seat 12B, and the flat surface portion 4a of the flank face 4 of the arcuate cutting edge portion 5a of the main cutting edge 5 of the second cutting insert 1B is brought into contact with the wall surface 12c of the second insert mounting seat 12B.

On the bottom surface 12a of the second insert mounting seat 12B, a second projection portion 14B is formed on the tip end side of the screw hole 12e, and a third projection portion 14C is formed between the screw hole 12e and the wall surface 12c. The second and third projection portions 14B and 14C also extend from the outer peripheral surface of the tip end portion of the end mill main body 11 toward the inner peripheral side. The second projection portion 14B is formed to be spaced from the wall surface 12b up to the front of the wall surface 12b of the second insert mounting seat 12B and the third projection portion 14C is formed to be spaced from the concave portion 12d up to the front of the concave portion 12d of the second insert mounting seat 12B. Accordingly, the second groove portion 8B of the second cutting insert 1B abuts against the second projection portion 14B, and the first groove portion 8A of the second cutting insert 1B abuts on the third projection portion 14C.

The second and third projection portions 14B and 14C also have a substantially rectangular shape in which a cross section orthogonal to the direction in which the second and third projection portions 14B and 14C extend is flat in the end mill rotational direction T. Among them, the second projection portion 14B is formed such that the entire second groove portion 8B of the second cutting insert 1B to be abutted is the narrow width portion 9, whereas the second projection portion 14B is formed so as to have a wide width as a whole from the other end side in the direction in which the second groove portion 8B extends from the one end side (from the outer peripheral side to the inner peripheral side of the end mill main body 11). The width of the third projection portion 14C is constant over the direction in which the third projection portion 14C extends.

Further, the widths of the second and third projection portions 14B and 14C (the width in the direction orthogonal to the direction in which the second and third projection portions 14B and 14C extend) are also slightly smaller than the width (the width in the direction orthogonal to the direction in which the second and first grooves 8B and 8A extend) at the position where it abuts the second and third projection portions 14B and 14C in the direction in which the second and first groove portions 8B and 8A extend. In addition, the protrusion heights of the second and third projection portions 14B and 14C from the bottom surface 12a of the second insert mounting seat 12B are also slightly smaller than the depths of the second and first groove portions 8B and 8A from the seating face 3 of the second cutting insert 1B.

As described above, the first and second cutting inserts 1A and 1B are seated on the first and second insert mounting seats 12A and 12B as described above, and when the clamp screw having an inverted truncated conical head portion is inserted through the mounting hole 7 and screwed into the screw hole 12e, since the center line of the screw hole 12e is slightly eccentric toward the concave portion 12d side from the center line of the mounting hole 7 of the cutting insert 1, the cutting insert 1 is pressed toward the concave portion 12d side.

At this time, in the first insert mounting seat 12A, the flank face 4 connected to the linear cutting edge portion 6b of the minor cutting edge 6 of the first cutting insert 1A and the flat surface portion 4a of the flank face 4 connected to the arcuate cutting edge portion 6a are pressed against the wall surfaces 12b and 12c, respectively. In addition, in the second insert mounting seat 12B, the flank face 4 connected to the linear cutting edge portion 5b of the main cutting edge 5 of the second cutting insert 1B is pressed against the wall surface 12b, and the flat surface portion 4a of the flank face 4 connected to the arcuate cutting edge portion 5a of the main cutting edge 5 is pressed against the wall surface 12c.

At the same time, in the first insert mounting seat 12A, the second groove portion 8B of the first cutting insert 1A abuts on the first projection portion 14A from the tip end side of the end mill main body 11. Accordingly, in the first projection portion 14A, the second wall surface 8b of the second groove portion 8B of the first cutting insert 1A is in contact with the side surface 14a facing the tip end side of the end mill main body 11 and a slight gap is formed between the first wall surface 8a and the first projection portion 14A in the second groove portion 8B.

In addition, in the second insert mounting seat 12B, the second and first grooves 8B and 8A of the second cutting insert 1B abuts on the second and third projection portions 14B and 14C from the tip end side of the end mill main body 11. Accordingly, in the second and third projection portions 14B and 14C, the first wall surfaces 8a of the second and first groove portions 8B and 8A respectively are in contact with the side surface 14a facing the tip end side of the end mill main body 11 and a slight gap is formed between the second wall surface 8b of the second and first groove portions 8B and 8A and the second and third projection portions 14B and 14C. As described above, the first and second grooves 8A and 8B come into contact with the first to third projection portions 14A to 14C, thereby preventing a displacement movement of the cutting insert 1 due to a load during the cutting operating.

In the cutting insert 1 and the indexable ball end mill of the above-described configuration, since the second groove portion 8B among the groove portion 8 of the cutting insert 1 includes the narrow width portion 9 in which the groove width becomes narrower from one end side to the other end side in the direction in which the second groove portion 8B extends, in the other end side of the second groove portion 8B in which the groove width of the narrow width portion 9 becomes narrower, it is possible to increase the wall thickness of the cutting insert 1 and improve the strength. Therefore, even if an excessive load acts on the cutting insert 1 during the cutting operating, damage to the cutting insert 1 from the second groove portion 8B can be prevented.

On the other hand, since the narrow width portion 9 is widened inversely on one end side in the direction in which the second groove portion 8B extends, in the end mill main body 11 of the indexable ball end mill, the first and second projection portions 14A and 14B in the portion where the narrow width portion 9 of the second groove portion 8B abuts can be formed to be wide. Therefore, it is possible to increase the mounting rigidity of the cutting insert 1 with respect to the load during the cutting operating, further reliably prevent the displacement of the cutting insert 1, and perform highly accurate cutting operating.

In addition, in the cutting insert 1 of the present embodiment, a groove width W1 at the other end, which is the narrowest of the narrow width portion 9, is set to be in a range of 0.05×r to 0.18×r with respect to the radius r of the arcuate cutting edge portion (the arcuate cutting edge portion 6a of the minor cutting edge 6) positioned on the other end side of the groove portion (the second groove portion 8B) having the narrow width portion 9 as seen from the seating face 3 side. Therefore, the mounting rigidity can be further enhanced while improving the strength of the cutting insert 1 more reliably. That is, if the groove width W1 at the other end of the narrow width portion 9 is too enough to be smaller than the above range, the widths of the first and second projection portions 14A and 14B of the insert mounting seat 12 also be narrowed, and there is a possibility that the mounting rigidity of the insert 1 cannot be increased. On the other hand, if the groove width W1 at the other end of the narrow width portion 9 is so large as to exceed the above range and the first and second wall surfaces 8a and 8b of the second groove portion 8B are close to parallel, the thickness of the cutting insert 1 can be secured large at the other end side of the second groove portion 8B, and it is impossible to secure the strength of the cutting insert 1. Therefore, there is a possibility that damage occurs when an excessive load is applied.

Figure 20A:
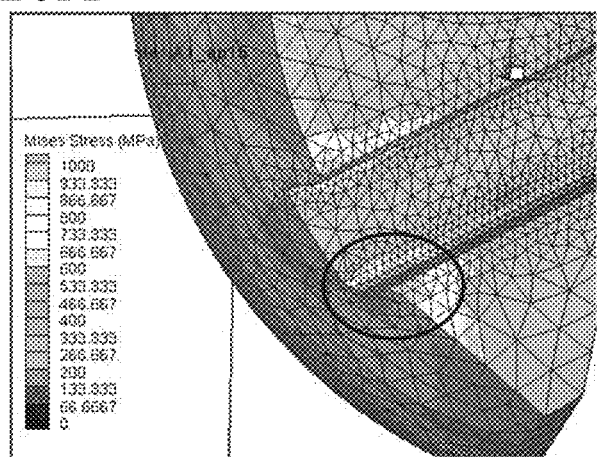
FIG. 20A is a view illustrating a dispersion state of stress by simulation analysis in a case where a groove width of the other end of a narrow width portion in a groove portion is changed, and is a view illustrating a case where the groove width is constant.
Figure 20B:
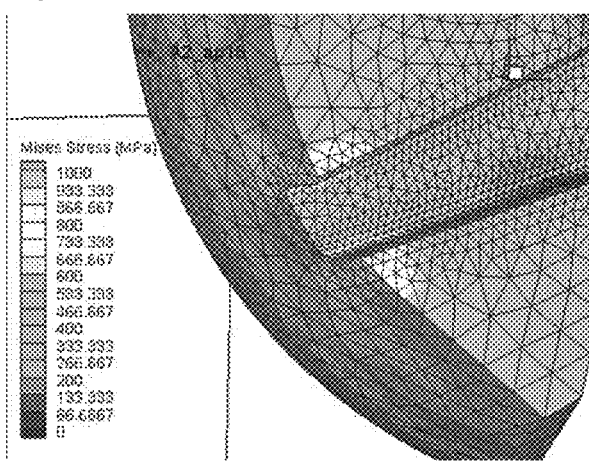
FIG. 20B is a view illustrating the dispersion state of the stress by simulation analysis in the case where the groove width of the other end of the narrow width portion in the groove portion is changed, and a view illustrating a case where the groove width of the other end of the narrow width portion with respect to a radius r of an arcuate cutting edge portion having the narrow width portion is 0.133×r.
Figure 20C:
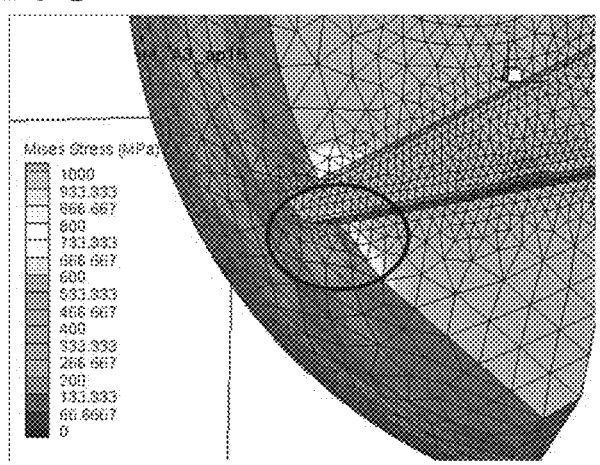
FIG. 20C is a view illustrating the dispersion state of the stress by simulation analysis in the case where the groove width of the other end of the narrow width portion in the groove portion is changed, and a view illustrating a case where the groove width of the other end of the narrow width portion with respect to the radius r of the arcuate cutting edge portion having the narrow width portion is 0.067×r.

Here, FIGS. 20A to 20C are diagrams illustrating a dispersion state of the stress by a simulation analysis in a case where the groove width W1 at the other end of the second groove portion is changed, and when the radius r of the arcuate cutting edge portion (the arcuate cutting edge portion 6a of the minor cutting edge 6) positioned on the other end side of the second groove portion 8B is 15.0 mm, FIG. 20A illustrates a case where the groove width W1 is constant at 3.0 mm over the entire length of the groove portion (in a case where the narrow width portion 9 is not provided), FIG. 20B illustrates a case where the narrow width portion 9 is provided and the groove width W1 at the other end with respect to the radius r of the arcuate cutting edge portion 6a is 2.0 mm (0.133×r), and FIG. 20C also illustrates a case where the narrow width portion 9 is provided and the groove width W1 at the other end with respect to the radius r of the arcuate cutting edge portion 6a is 1.0 mm (0.067×r). In the analysis, a case where a rotation speed of the end mill main body 11 is 2500 min$^{-1}$, a rotational speed is 230 m/min, a feed speed is 1500 mm/min (the feed amount per one blade was 0.3 mm/l blade), both the cutting amount and the cutting width are 15 mm, a workpiece is S45C (hardness 220 HB), and a material of the end mill main body is SKD 61 (hardness 45 HRC, tensile strength 1600 MPa, fatigue strength 500 MPa) is assumed, it is evaluated by Mises' stress.

In these FIGS. 20A to 20C, the region on the groove portion side of the portion drawn in white on the seating face 3 is the range where the stress is concentrated. In this regard, the portion drawn in white in FIGS. 20B and 20C by the cutting insert having the narrow width portion 9 is smaller than the result in FIG. 20A by the cutting insert in which the groove width is constant and does not have the narrow width portion 9. In particular, the range in which the stress concentrates most is smaller in FIG. 20C due to the cutting insert having the smaller groove width W1. From the result, it is possible to secure the strength of the cutting insert 1 by dispersing the stress by providing the narrow width portion 9. In addition, it can be found that it is preferable that the groove width W1 is in the range of 0.05×r to 0.18×r.

The groove width W1 is more preferably in the range of 0.06×r to 0.17×r, further preferably in the range of 0.065×r to 0.16×r. In addition, the groove width W1 is preferably in the range of 0.25×W2 to 0.90×W2 with respect to the groove width W2 at one end of the narrow width portion 9, is more preferably in the range of 0.30×W2 to 0.85×W2, and is still more preferably in the range of 0.32×W2 to 0.80×W2. On the other hand, the groove width W2 at one end of the narrow width portion 9 is preferably in the range of 0.10×r to 0.30×r with respect to the radius r, is more preferably in the range of 0.12×r to 0.28×r, and is still more preferably in the range of 0.15×r to 0.26×r.

In the cutting insert 1 of the present embodiment, the arcuate cutting edge portion 6a of the minor cutting edge 6 has the same radius as arcuate cutting edge portion 5a of the main cutting edge 5. However, the length in a circumferential direction is short, that is, is formed. In accordance with this, also in the indexable ball end mill of the present embodiment, the first insert mounting seat 12A is formed so as to cut away the tip end portion of the end mill main body 11 to the range including the axis O at the front end side, while the second insert mounting seat 12B is formed at a position slightly spaced from the axis O toward the outer peripheral side. Further, one kind of two cutting inserts 1 having the same shape and the same size as that of the first and second insert mounting seats 12A and 12B are positioned in the same convex hemispherical surface shape such that the first cutting insert 1A extends from the vicinity of the axis O of the tip end of the end mill main body 11 to the arcuate cutting edge portion 5a of the main cutting edge 5 and the second cutting insert 1B extends from the position where the arcuate cutting edge portion 6a of the minor cutting edge 6 is away from the axis O.

Therefore, it is possible to perform cutting from the vicinity of the axis O of the tip end of the end mill main body 11 to the outer periphery and cutting from the position distant from the axis O to the outer periphery by one kind of cutting insert 1, and it is easy to manage the cutting insert 1. In addition, only one type of die for manufacturing the cutting insert 1 is sufficient. In addition, in a case where abrasion or the like is caused by cutting in the main cutting edge 5 of the first cutting insert 1A and the minor cutting edge 6 of the second cutting insert 1B, by reattaching the cutting insert 1 to the opposite insert mounting seat 12, the first cutting insert 1A is reused as the second cutting insert 1B and the second cutting insert 1B is reused as the first cutting insert 1A. Therefore, it is economical.

Furthermore, in the present embodiment, the second groove portion 8B having the narrow width portion 9 extends from the arcuate cutting edge portion 6a side of the minor cutting edge 6 toward the linear cutting edge portion 5b side of the main cutting edge 5. Among them, the linear cutting edge portion 5b side of the main cutting edge 5 of the narrow width portion 9 is the one end side and the arcuate cutting edge portion 6a side of the minor cutting edge 6 is the other end side. Therefore, in a case where the minor cutting edge 6 is used for cutting as the second cutting insert 1B, even if the second groove portion 8B is opened in the flank face 4 connected to the arcuate cutting edge portion 6a of the minor cutting edge 6 as in the present embodiment, the load acting on the minor cutting edge 6 can be received by the other end side of the narrow width portion 9 of the second groove portion 8B which has become narrower and it is possible to secure the strength. The displacement of the second cutting insert 1B along the arcuate cutting edge portion 5a of the main cutting edge 5 which is not used for cutting can be reliably prevented at the wider one end of the narrow width portion 9 of the second groove portion 8B separated from the arcuate cutting edge portion 5a.

Figure 31:
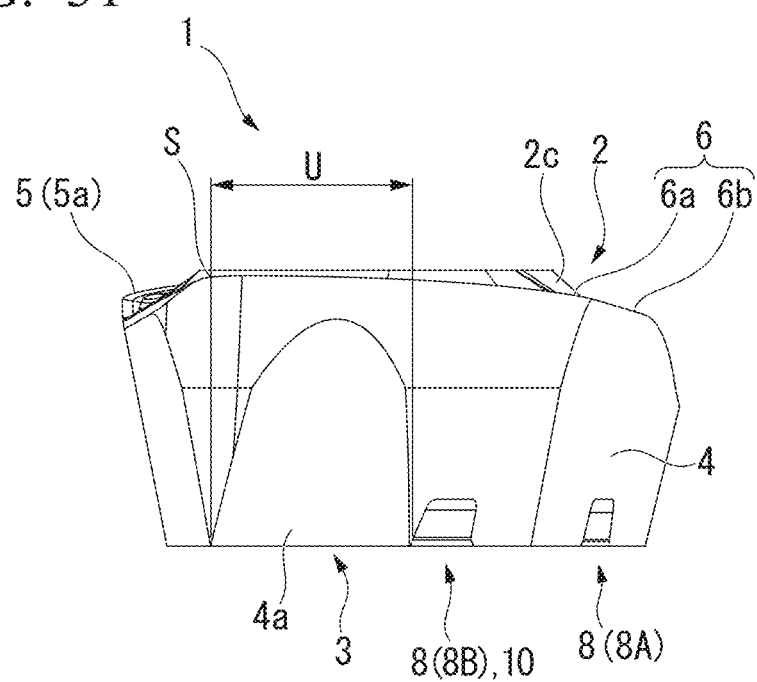
FIG. 31 is a side view as viewed in a direction of an arrow B in FIG. 29.

In addition, in the present embodiment, the arcuate cutting edge portion 5a of the main cutting edge 5 and the arcuate cutting edge portion 6a of the minor cutting edge 6 are separated from the seating face 3 side as they are separated from the linear cutting edge portions 5b and 6b and is formed into a convex curved shape which approaches the seating face 3 side again. Accordingly, since the arcuate cutting edge portions 5a and 6a gradually bite and cut into the workpiece from the rotationally most projecting point S which is convex most distantly with respect to the seating face 3 at the time of cutting, it is possible to reduce the cutting resistance. In addition, on the other end side where the groove width W1 of the second groove portion 8B formed on the seating face 3 of the cutting insert 1 is narrowed, the thickness at the rotationally most projecting point S can be secured and the strength can be improved, and it is possible to prevent the cutting insert 1 from being damaged due to the load during the cutting operating. The thickness at the rotationally most projecting point S is the distance from the seating face 3 to the rotationally most projecting point S in a direction perpendicular to the seating face 3 as indicated by a symbol t in FIG. 4. In addition, in the narrow width portion 9 on the other end side of the second groove portion 8B, the range in which the thickness of the cutting insert 1 is secured by the rotationally most projecting point S is denoted by a symbol U in FIGS. 4, 7, and 31. The value of the insert wall thickness in the region denoted by the symbol U is preferably in the range of 0.65×t to 1.00×t with respect to the above t value, is more preferably in the range of 0.70×t to 1.00×t, and is still more preferably in the range of 0.75×t to 1.00×t.

In addition, in the present embodiment, arcuate cutting edge portions 5a and 6a are formed in a convex curved shape and as described above, the second groove portion 8B opens on the flank face 4 connected to the arcuate cutting edge portion 6a of the minor cutting edge 6. However, the opening portion of the second groove portion 8B to the flank face 4 is positioned closer to the linear cutting edge portion 6b side of the minor cutting edge 6 than the rotationally most projecting point S of the arcuate cutting edge portion 6a of the minor cutting edge 6. Accordingly, it is possible to prevent the impact when the arcuate cutting edge portion 6a of the minor cutting edge 6 bites into the workpiece and cuts from the rotationally most projecting point S from directly propagating to the opening of the second groove portion 8B and the damage of the cutting insert 1 from the opening of the second groove portion 8B due to such impact can also be prevented.

In order to reliably prevent damage to the cutting insert 1 due to such impact, as in the present embodiment, in the bottom view, a first intersecting angle θ1 formed by a straight line L1 connecting the rotationally most projecting point S and a center P of the arcuate cutting edge portion 6a of the minor cutting edge 6 and a straight line L2 connecting an end portion Q toward the seating face 3 side of the intersecting ridgeline between a first wall surface 8a of the second groove portion 8B directed toward the linear cutting edge portion 6b of the minor cutting edge 6 and the flank face 4 and a center P of the arcuate cutting edge portion 6a of the minor cutting edge 6 is preferably in a range of 5° to 60°. The first intersecting angle θ1 is more preferably in the range of 5° to 40°, and is still more preferably in the range of 5° to 20°.

If the first intersecting angle θ1 is too small to be less than 5°, there is a possibility that the opening portion of the second groove portion 8B toward the flank face 4 is too close to the rotationally most projecting point S of the arcuate cutting edge portion 6a of the minor cutting edge 6 where the flank face 4 is continuous and the cutting insert 1 is damaged by the impact when the arcuate cutting edge portion 6a bites the workpiece from the rotationally most projecting point S. Conversely, if the first intersecting angle θ1 is larger than 60°, in a case where the cutting insert 1 is attached by inserting a clamp screw through the mounting hole 7 of the cutting insert 1 and screwing it into a screw hole 12e of the insert mounting seat 12 as described in the present embodiment, the second groove portion 8B or the first and second projection portions 14A and 14B may interfere with the mounting hole 7 or the screw hole 12e.

In addition, similarly, in the present embodiment, a second intersecting angle θ2 formed by a straight line L1 connecting the rotationally most projecting point S and the center P of the arcuate cutting edge portion 6a of the minor cutting edge 6 and the extended line L3 of the linear cutting edge portion 6b of the minor cutting edge 6 toward the arcuate cutting edge portion 6a side of the minor cutting edge 6 is in a range of 10° to 50°. Accordingly, even in this case, while preventing interference between the second groove portion 8B, the first and second projection portions 14A and 14B and the mounting hole 7, and the screw hole 12e, the cutting resistance can be reliably reduced by the convex curved arcuate cutting edge portion 6a of the minor cutting edge 6. The second intersecting angle θ2 is more preferably in the range of 15° to 48° and is still more preferably in the range of 35° to 47°.

That is, when the cutting insert 1 is attached to the second insert mounting seat 12B as the second cutting insert 1B, in the bottom view facing the seating face 3 of the second cutting insert 1B or in a plan view seen from the direction facing the rake face 2 along the center line of the mounting hole 7, the extended line L3 is substantially parallel to the axis O of the end mill main body 11. Therefore, the second intersecting angle θ2 is substantially equal to the intersecting angle formed by the straight line L1 connecting the center P of the arcuate cutting edge portion 6a positioned on the axis O and the rotationally most projecting point S and the axis O. However, the linear cutting edge portions 5b and 6b may have a slight back taper angle when the cutting insert 1 is attached to the end mill main body 11 or may not be exactly equal to the intersecting angle θ2 formed by the straight line L1 and the axis O.

If the second intersecting angle θ2 is larger than 50°, when the first intersecting angle θ1 is set to the above-described range, there is a possibility that the second groove portion 8B or the first and second projection portions 14A and 14B interfere with the mounting hole 7 and the screw hole 12e. Furthermore, if the second intersecting angle θ2 is larger than 50°, since a region where the axial rake angle of the arcuate cutting edge portion 6a of the second cutting insert 1B increases, the discharge performance of the chip tends to deteriorate.

In addition, if the second intersecting angle θ2 is too small to be less than 10°, at the arcuate cutting edge portion 6a of the second cutting insert 1B, the rotationally most projecting point S approaches the axis O too much, and the arcuate cutting edge portion 6a of the minor cutting edge 6 cuts into the workpiece from a portion where the rotational speed around the axis O is small. Therefore, an effect of reducing the cutting resistance may be impaired.

Furthermore, in the present embodiment, the first groove portion 8A is formed on the seating face 3 of the cutting insert 1, and when it is used as the second cutting insert 1B, since the first groove portion 8A also abuts on the third projection portion 14C of the second insert mounting seat 12B, it is possible to more reliably prevent the second cutting insert 1B from being displaced. In also the bottom surface 12a of the first insert mounting seat 12A, the projection portion 14C on which the first groove portion 8A abuts may be formed. In addition, since the first groove portion 8A is formed in the shape of the notch groove does not open to the flank face 4 connected to the arcuate cutting edge portion 5a of the main cutting edge 5, when it is used as the first cutting insert 1A, the strength of the arcuate cutting edge portion 5a of the main cutting edge 5 can be improved and the chip will not be bitten into in the first groove portion 8A.

Figure 21:
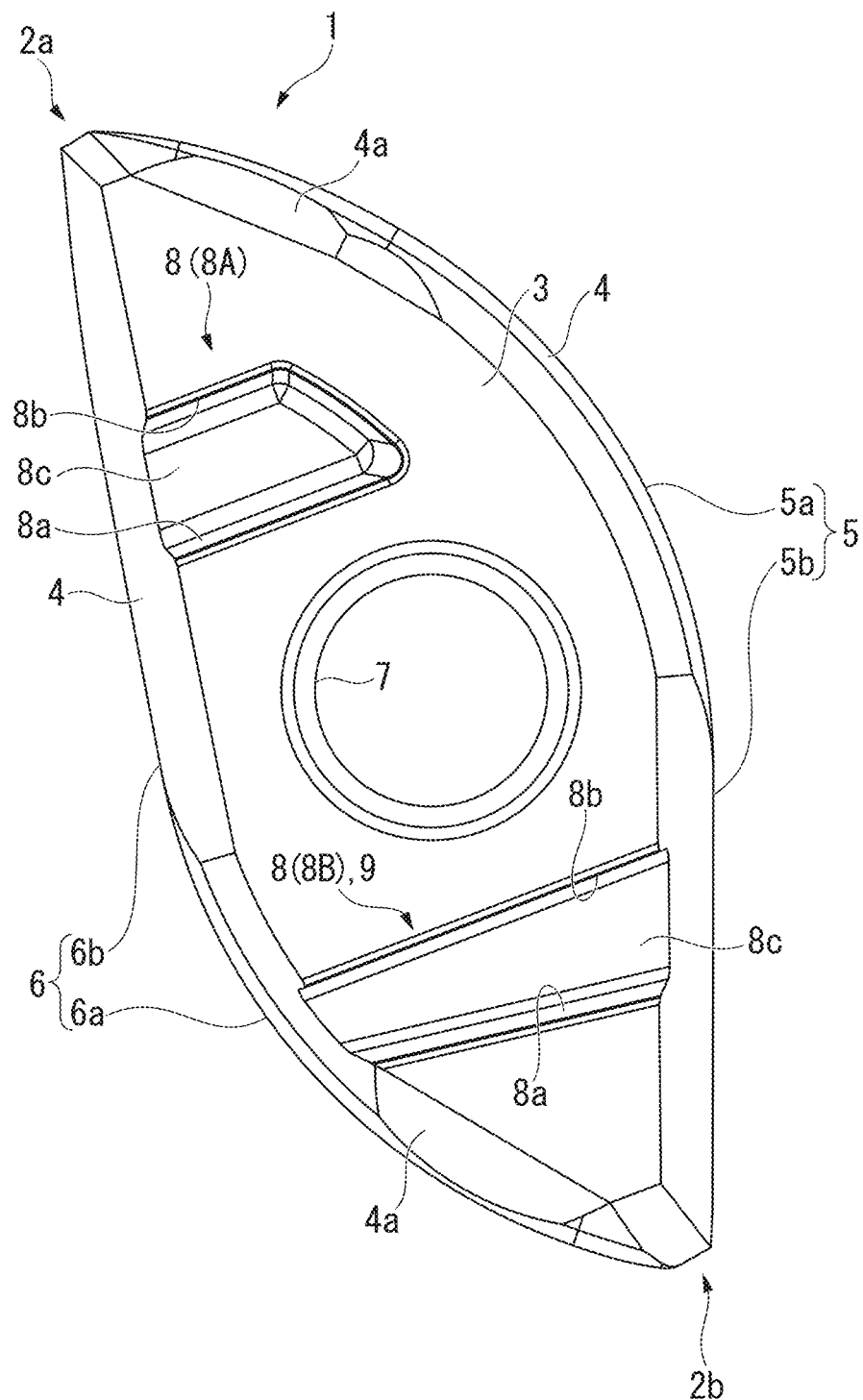
FIG. 21 is a bottom view illustrating a modification example of the first embodiment.

Next, FIG. 21 is a modification of the cutting insert 1 of the first embodiment illustrated in FIGS. 1 to 7, in the modification example or the drawings of the second to fifth embodiment to be described, the same reference numerals will be assigned to the portion common to the first embodiment. In addition, an auxiliary line indicating the size and angle illustrated in FIG. 3 is also omitted. However, unless otherwise specified, the dimensions and angles of the first embodiment are directly applied.

In the cutting insert 1 of the first embodiment illustrated in FIGS. 1 to 7, the end portion of the main cutting edge 5 on the arcuate cutting edge portion 5a side in the first groove portion 8A extends so as to be orthogonal to the first and second wall surfaces 8a and 8b of the first groove portion 8A and is in a substantially rectangular shape when viewed from the direction in which the first groove portion 8A faces the seating face 3. On the other hand, in the cutting insert 1 of the modification example, the end portion of the main cutting edge 5 on the arcuate cutting edge portion 5a side in the first groove portion 8A is formed in a convex curved shape parallel to the arcuate cutting edge portion 5a of the main cutting edge 5 when viewed from the direction facing the seating face 3 or an oblique side shape oblique to the first and second wall surfaces 8a and 8b and it is substantially trapezoidal as seen from the direction facing the seating face 3.

In the cutting insert 1 of such a modification example, since the distance between the intersecting ridgeline between the seating face 3 and the flank face 4 and the end portion on the arcuate cutting edge portion 5a side of the main cutting edge 5 in the first groove portion 8A can be made substantially constant, the strength of the interval portion can also be made substantially constant. When it is used as the first cutting insert 1A, the strength of the arcuate cutting edge portion 5a of the main cutting edge 5 can be more reliably improved. In addition, even in a case where the second projection portion 14C of the second insert mounting seat 12B of the end mill main body 11 and the projection portion 14C in which the first groove portion 8A abuts the first insert mounting seat 12A are formed, by forming the projection portion 14C in a substantially trapezoidal shape corresponding to the first groove portion 8A as seen from the direction opposed to the bottom surface 12a of the insert mounting seat 12, it is possible to attach the cutting insert 1 more stably by increasing an abut area with the first groove portion 8A.

Figure 22:
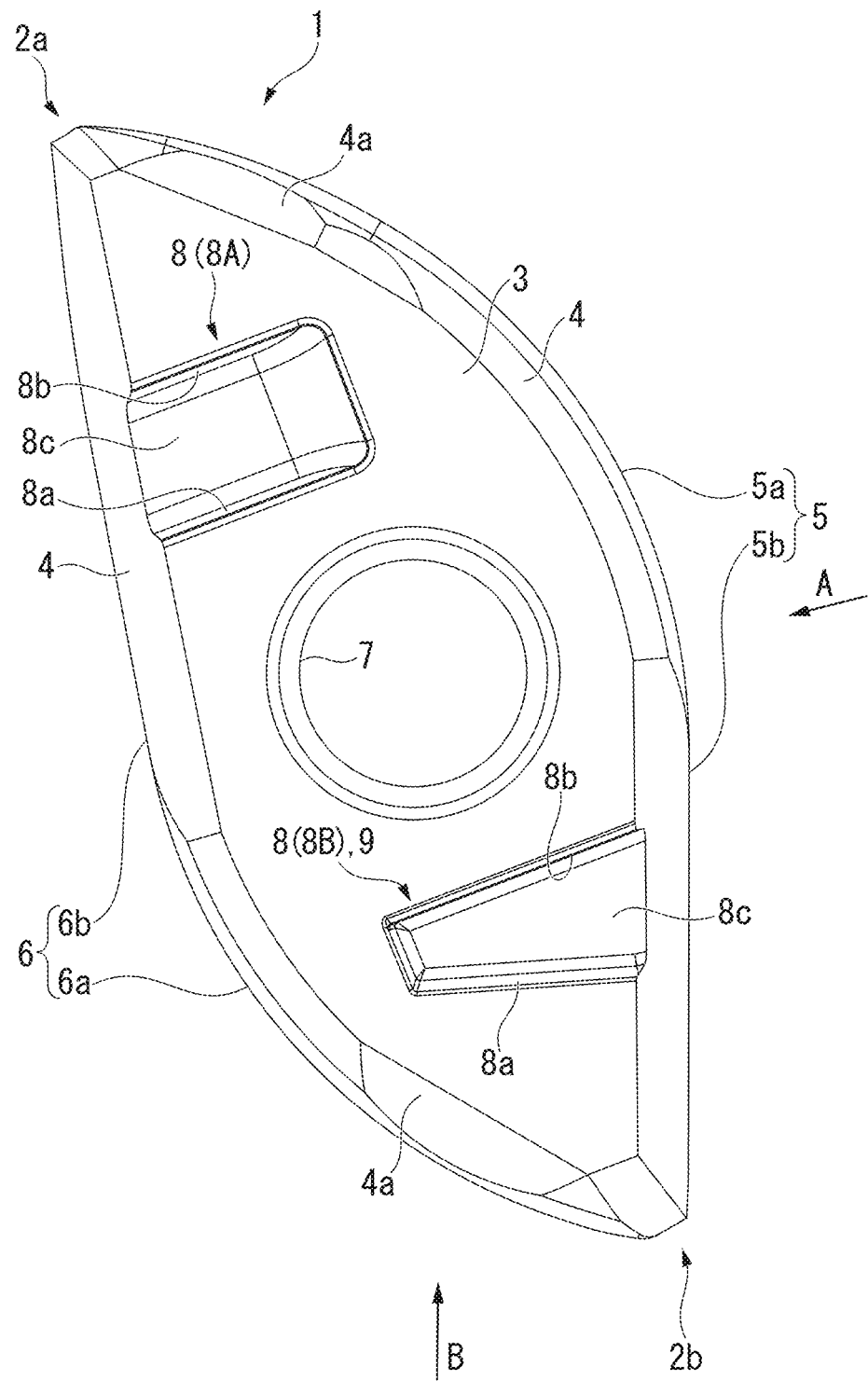
FIG. 22 is a bottom view illustrating a second embodiment of the cutting insert of the present invention.
Figure 23:
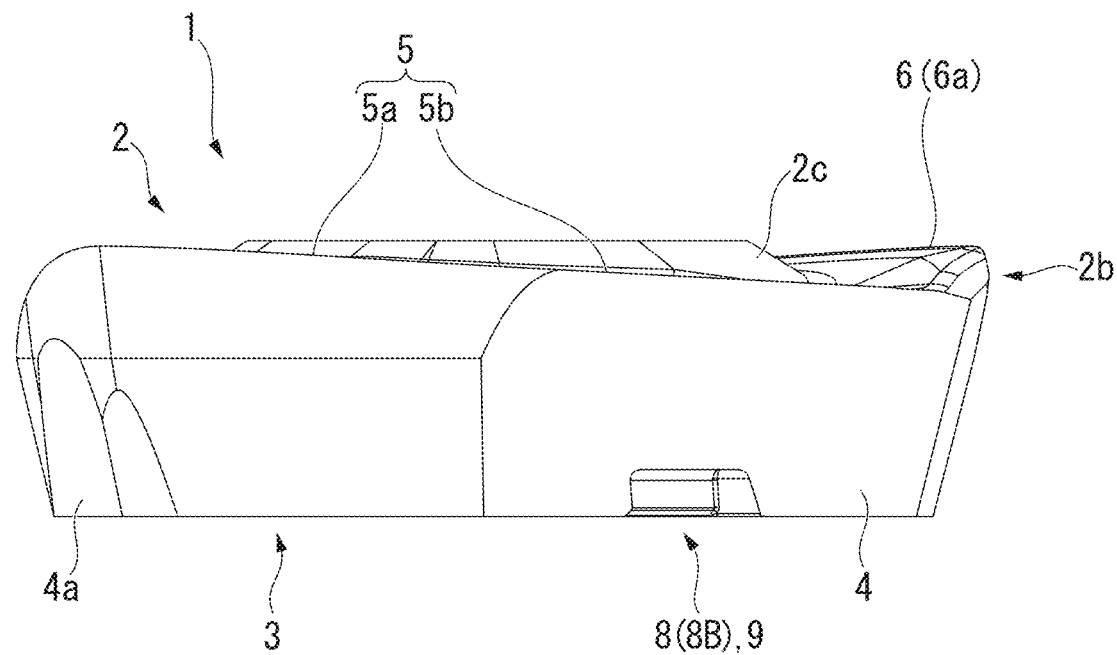
FIG. 23 is a side view as viewed in a direction of an arrow A in FIG. 22.
Figure 24:
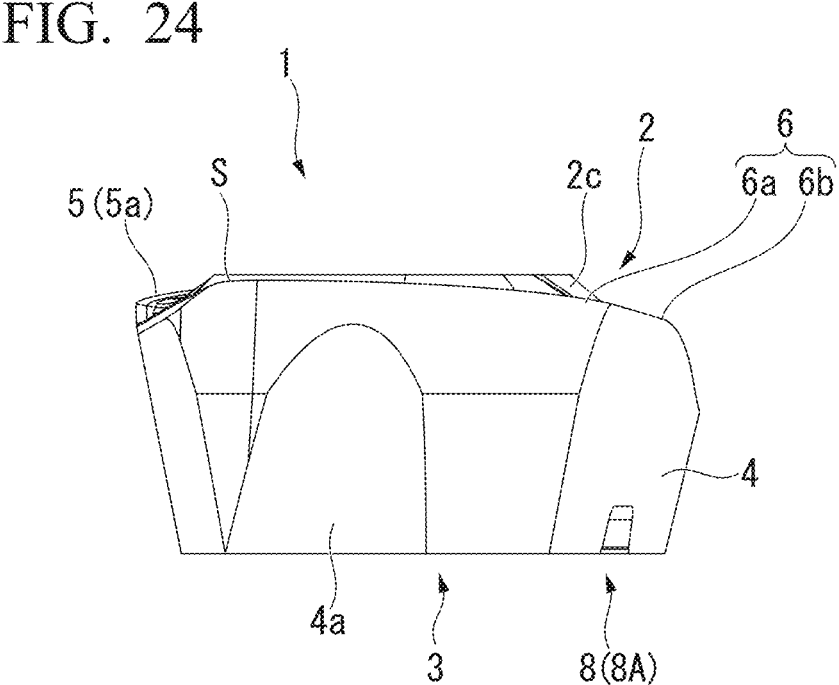
FIG. 24 is a side view as viewed in a direction of an arrow B in FIG. 22.
Figure 25:
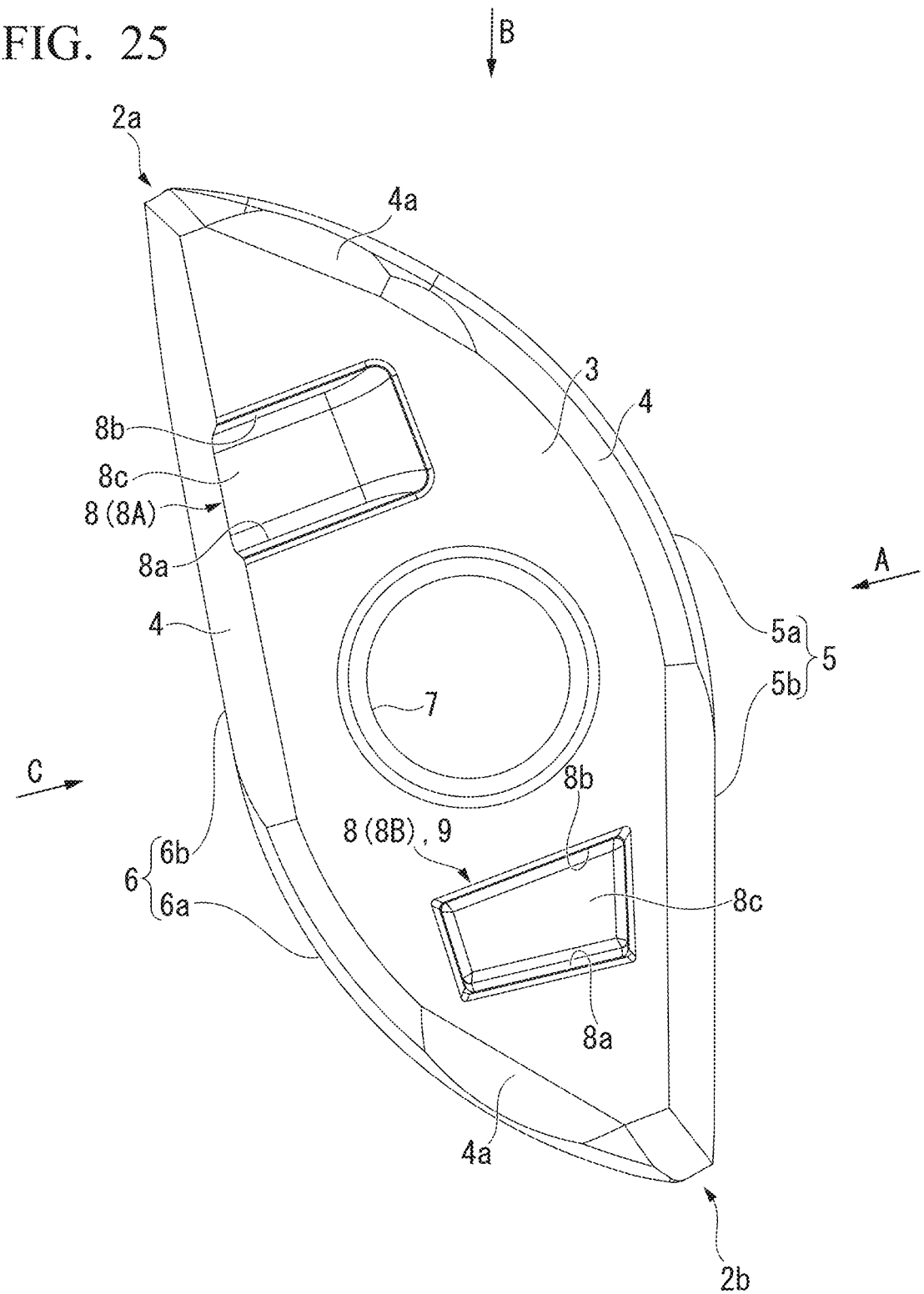
FIG. 25 is a bottom view illustrating a third embodiment of the cutting insert of the present invention.
Figure 26:
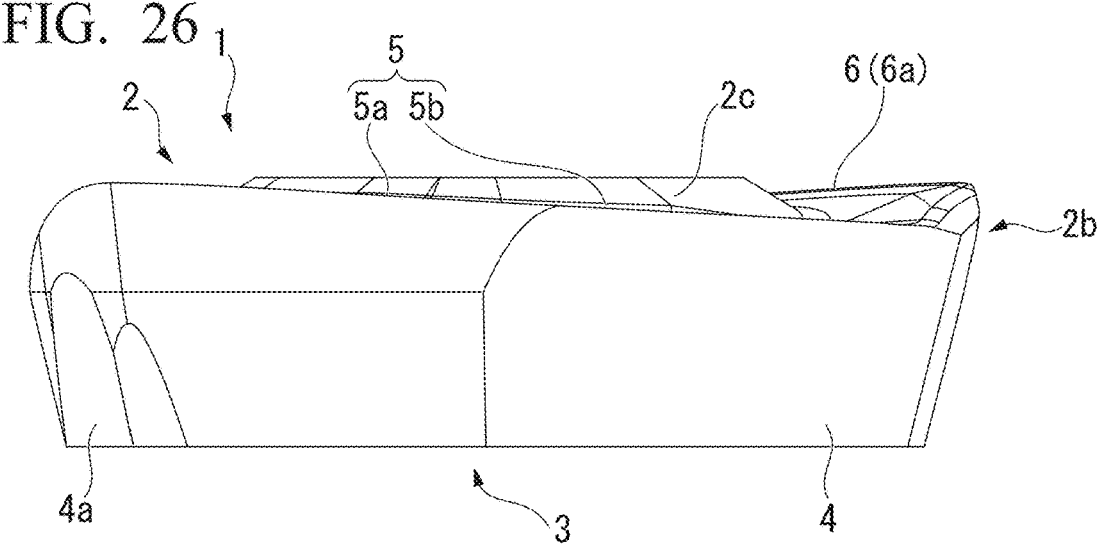
FIG. 26 is a side view as viewed in a direction of an arrow A in FIG. 25.

On the other hand, in the first embodiment, the second groove portion is formed in a through groove shape opening to the flank face 4 connected to the linear cutting edge portion 5b of the main cutting edge 5 and the flank face 4 connected to the arcuate cutting edge portion 6a of the minor cutting edge 6. However, the second groove portion 8B may be formed in the shape of a notch groove which is free of an opening in at least one of the flank face 4 on one end side in the direction in which the second groove portion 8B extends and the flank face 4 on the other end side. For example, FIGS. 20 to 22 illustrate a second embodiment of the cutting insert 1 of the present invention, and in this second embodiment, the second groove portion 8B having the narrow width portion 9 is formed in the shape of the notch groove which is free of an opening to the flank face 4 connected to the arcuate cutting edge portion 6a of the minor cutting edge 6. Therefore, it is possible to improve the strength of the arcuate cutting edge portion 6a of the minor cutting edge 6 and to prevent damage.

In addition, FIGS. 23 to 26 illustrate a third embodiment of the cutting insert 1 according to the present invention. In this third embodiment, the second groove portion 8B having the narrow width portion 9 does not open on the flank face 4 connected to the arcuate cutting edge portion 6a of the minor cutting edge 6 and is formed in the shape of the notch groove which is free of an opening to the flank face 4 connected to the linear cutting edge portion 5b of the main cutting edge 5. Therefore, it is possible to improve the strength of the arcuate cutting edge portion 6a of the minor cutting edge 6 and the linear cutting edge portion 5b of the main cutting edge 5.

Figure 27:
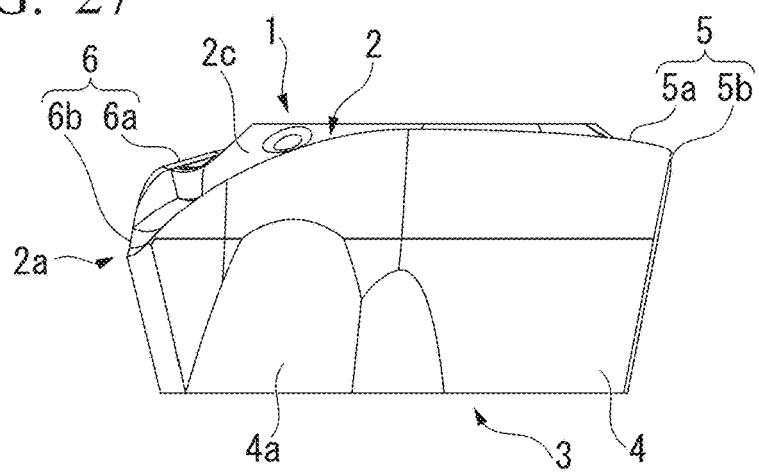
FIG. 27 is a side view as viewed in a direction of an arrow B in FIG. 25.
Figure 28:
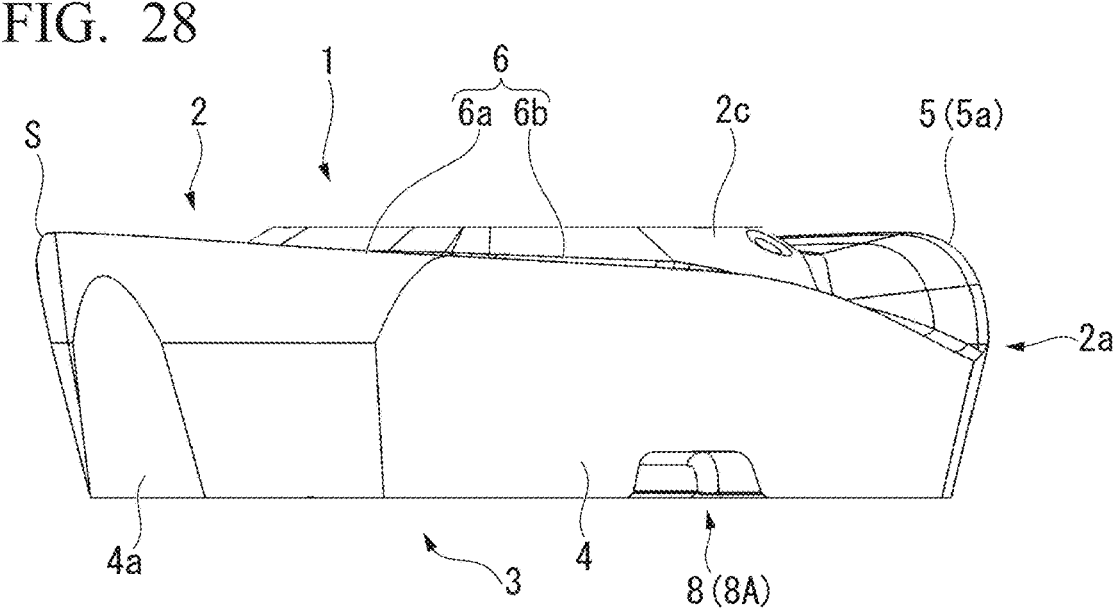
FIG. 28 is a side view as viewed in a direction of an arrow C in FIG. 25.
Figure 29:
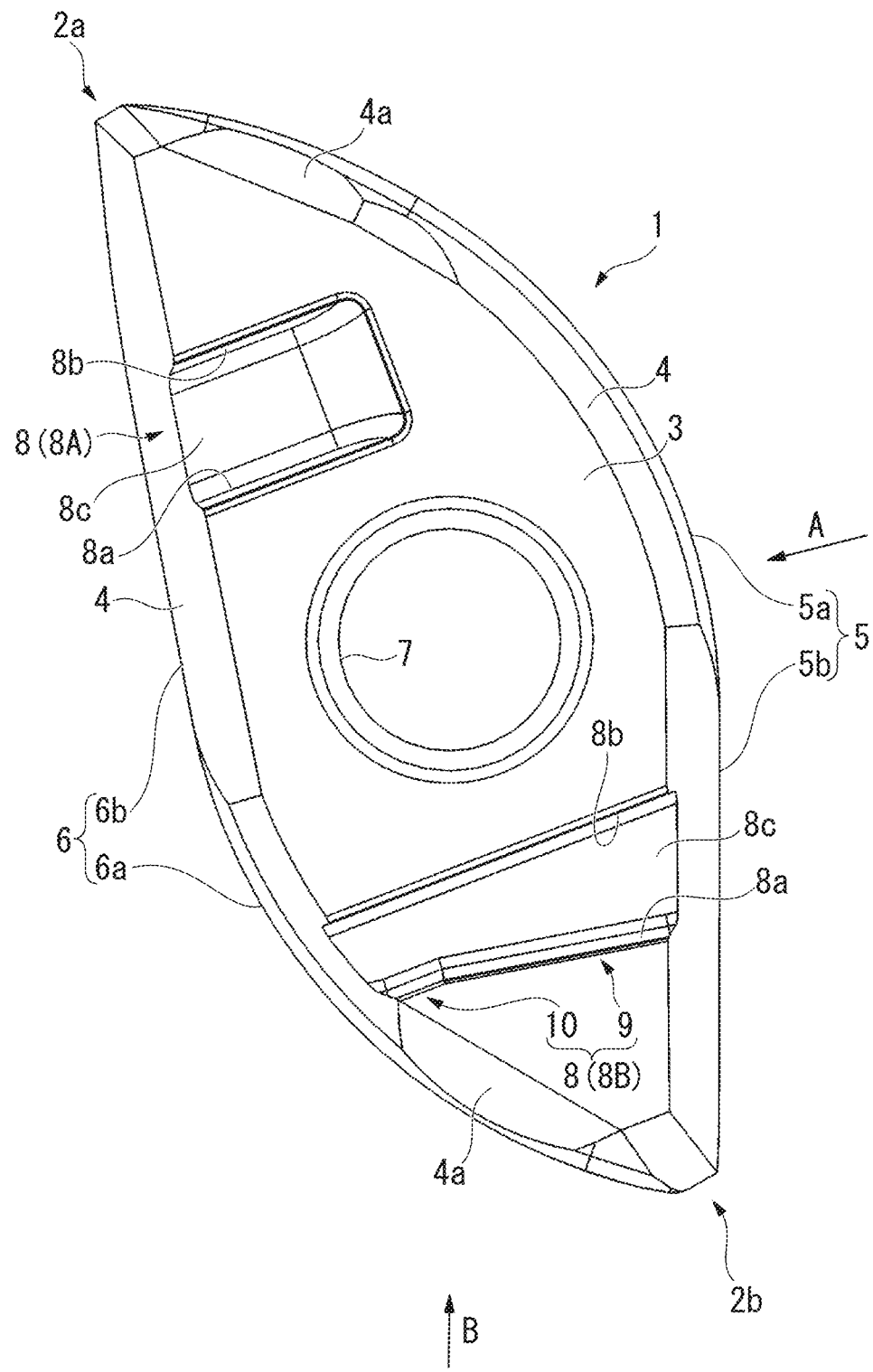
FIG. 29 is a bottom view illustrating a fourth embodiment of the cutting insert of the present invention.
Figure 30:
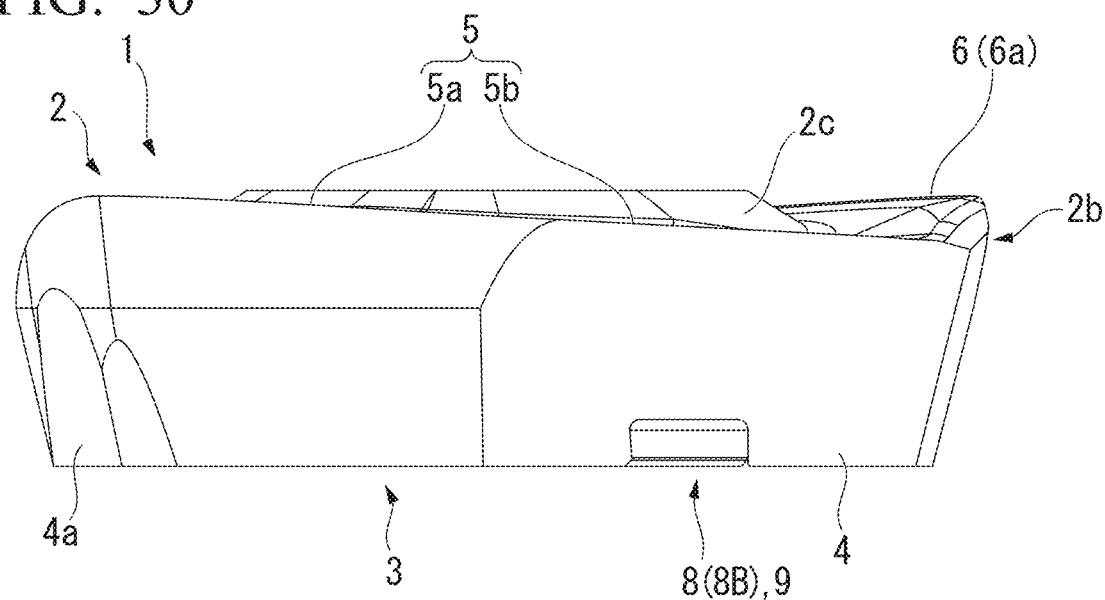
FIG. 30 is a side view as viewed in a direction of an arrow A in FIG. 29.

Next, FIGS. 27 to 29 illustrate a fourth embodiment of the cutting insert 1 of the present invention, and FIG. 30 illustrates a fifth embodiment of the cutting insert 1 of the present invention. In the first to third embodiments, the entire groove width of the second groove portion 8B was the narrow width portion 9 in which the groove width gradually narrowed from the one end side to the other end side, whereas, in the fourth and fifth embodiment, at least one of the one end side and the other end side of the second groove portion 8B is an equal width portion 10 having a constant groove width.

Here, in the fourth and fifth embodiments, similar to the first embodiment, one end side of the second groove portion 8B intersecting the flank face 4 connected to the linear cutting edge portion 5b of the main cutting edge 5 becomes the narrow width portion 9 where the groove width becomes narrower toward the other end side and the other end side of the second groove portion 8B intersecting with the flank face 4 connected to the arcuate cutting edge portion 6a of the minor cutting edge 6 becomes the equal width portion 10. However, in the fourth embodiment, similar to the first to third embodiments, the rate at which the groove width of the narrow width portion 9 narrows is constant from the one end side to the other end side. However, in the fifth embodiment, the rate at which the groove width of the narrow width portion 9 narrows decreases from the one end side to the other end side. That is, in the fifth embodiment, the second wall surface 8b facing the second end portion 2b side of the rake face 2 in the second groove portion 8B is linear in the bottom view, whereas the first wall surface 8a facing the first end portion 2a is in a convex curved shape in the bottom view and is in contact with the first wall surface 8a of the equal width portion 10.

In such a cutting insert 1 of the fourth and fifth embodiments, since the second groove portion 8B includes the narrow width portion 9, on the other end side of the narrow width portion 9, it is possible to secure the thickness of the cutting insert 1 to improve the strength and to prevent the cutting insert from being damaged. In addition, since it is possible to prevent the groove width from becoming too narrow by providing the equal width portion 10 having a constant groove width on the other end side of the narrow width portion 9 of the second groove portion 8B, by making the first and second projection portions 14A and 14B in the insert mounting seat 12 of the end mill main body 11 have the same shape as that of the second groove portion 8B, it is possible to suppress the widths of the first and second projection portions 14A and 14B from becoming too small, and it is possible to secure the mounting rigidity of the cutting insert 1 more reliably.

Such an equal width portion 10 may be provided on one end side of the second groove portion 8B or may be provided on both end sides. Further, in the cutting insert 1 of the first to fifth embodiments, the groove width of the first groove portion 8A is constant. However, the first groove portion 8A may have the narrow width portion 9 narrowing from the one end side to the other end side. In that case, the narrow width portion 9 of the first groove portion 8A may be narrower from one end side to the other end side in the same direction as the narrow width portion 9 of the second groove portion 8B and may be narrower from one end side to the other end side in the direction opposite to the narrow width portion 9 of the second groove portion 8B.

INDUSTRIAL APPLICABILITY

According to the present invention, by the narrow width portion of the groove portion formed on the seating face of the cutting insert, on the other end side in the direction in which the groove portion in which the groove width becomes narrower, since the thickness of the cutting insert is secured and the stress is dispersed, it is possible to improve the strength and it is possible to prevent the cutting insert from being damaged by the load during the cutting operating. On the other hand, since the groove width of the narrow width portion is wider on one end side in the direction in which the groove portion extends, the projection portion of the indexable ball end mill can be formed to be wide and it is possible to enhance the mounting rigidity of the cutting insert and reliably prevent the displacement movement.

REFERENCE SIGNS LIST 1 (1A, 1B): cutting insert
2: rake face
3: seating face
4: flank face
5: main cutting edge (one of two edges)
5a: arcuate cutting edge portion of main cutting edge 5
5b: linear cutting edge portion of main cutting edge 5
6: minor cutting edge (the other of two edges)
6a: arcuate cutting edge portion of minor cutting edge 6
6b: linear cutting edge portion of minor cutting edge 6
7: mounting hole
8, 8A, 8B: groove portion
9: narrow width portion
10: equal width portion
11: end mill main body
12 (12A, 12B): insert mounting seat
14A, 14B, 14C: projection portion
r: radius of arcuate cutting edge portion (6a) positioned on the other end side of narrow width portion in groove portion (second groove portion 8B)
P: center of arc formed by arcuate cutting edge portion 6a of minor cutting edge 6 in bottom view
Q: end portion toward seating face 3 side of intersecting ridgeline portion between first wall surface 8a of second groove portion 8B facing linear cutting edge portion 6b side of minor cutting edge 6 and the flank face 4
S: rotationally most projecting point of arcuate cutting edge portion 6a of minor cutting edge 6
t: thickness of cutting insert 1 at rotationally most projecting point S
U: range where thickness of cutting insert 1 is secured at rotationally most projecting point S
L1: straight line connecting center P and rotationally most projecting point S in bottom view L2: straight line connecting center P and end portion Q in bottom view
L3: extended line of linear cutting edge portion 6b of minor cutting edge 6 toward arcuate cutting edge portion 6a side of minor cutting edge 6 in bottom view
W1: groove width in the other end of narrow width portion 9
W2: groove width in an end of narrow width portion 9
O: axis of end mill main body 11
T: end mill rotational direction
θ1: first intersecting angle
θ2: second intersecting angle

What is claimed is:

1. A cutting insert to be detachably attached to an insert mounting seat formed at a tip end portion of an end mill main body of an indexable ball end mill rotatable about an axis, the cutting insert comprising:
a rake face facing a direction of rotation of the end mill main body;
a seating face facing an opposite side to the rake face and configured to be seated on a bottom surface of the insert mounting seat; and
a flank face extending around the rake face and the seating face,
wherein two cutting edges each having an arcuate cutting edge portion extending in an arc shape in plan view when viewed from a direction opposed to the rake face and a linear cutting edge portion extending so as to be in contact with the arcuate cutting edge portion are formed on an intersecting ridgeline portion between the rake face and the flank face so that the arcuate cutting edge portion and the linear cutting edge portion are alternately positioned in a circumferential direction of the rake face,
a groove portion having a wall surface configured to be capable of coming into contact with a projection portion protruding from the bottom surface of the insert mounting seat is formed on the seating face,
the groove portion has a narrow width portion in which a groove width decreases from one end side toward the other end side in a direction along which the groove portion extends from the arcuate cutting edge portion to the linear cutting edge portion, and
at the other end side of the narrow width portion, the narrow width portion is opened in the flank face.

2. The cutting insert according to claim 1,
wherein one of the two cutting edges is a main cutting edge and the other is a minor cutting edge,
the arcuate cutting edge portion of the minor cutting edge is formed to have a same radius as a radius of the arcuate cutting edge portion of the main cutting edge and have a shorter length than a length of the arcuate cutting edge portion of the main cutting edge in the circumferential direction,
the groove portion extends from an arcuate cutting edge portion side of the minor cutting edge toward a linear cutting edge portion side of the main cutting edge, the linear cutting edge portion side of the main cutting edge is set as the one end side, and the arcuate cutting edge portion side of the minor cutting edge is set as the other end side, and
wherein the groove portion is opened in the flank face connected to the arcuate cutting edge portion of the minor cutting edge.

3. The cutting insert according to claim 2,
the arcuate cutting edge portion of the minor cutting edge is formed in a convex curved shape in such a way that the arcuate cutting edge portion extends to the seating face side after being extended away from the seating face side as more apart from the linear cutting edge portion of the minor cutting edge, and
the opening portion to the flank face of the groove portion is positioned closer to the linear cutting edge portion side of the minor cutting edge than the rotationally most projecting point where the arcuate cutting edge portion of the minor cutting edge projects most with respect to the seating face.

4. The cutting insert according to claim 3,
wherein in the bottom view when viewed from the direction opposing the seating face, a first intersecting angle formed by a straight line connecting the rotationally most projecting point and a center of the arcuate cutting edge portion of the minor cutting edge and a straight line connecting the end portion toward the seating face side of the intersecting ridgeline portion between a wall surface of the groove portion directed toward the linear cutting edge portion side of the minor cutting edge and the flank face and the center of the arcuate cutting edge portion of the minor cutting edge is in a range of 5° to 60°.

5. The cutting insert according to claim 3,
wherein in the bottom view when viewed from the direction opposing the seating face, a second intersecting angle formed by a straight line connecting the rotationally most projecting point and the center of the arcuate cutting edge portion of the minor cutting edge and an extended line of a linear cutting edge portion of the minor cutting edge toward the arcuate cutting edge portion side of the minor cutting edge is in a range of 10° to 50°.

6. The cutting insert according to claim 1,
wherein the groove portion is free of an opening in of the flank face on the one end side in the direction in which the groove portion extends.

7. The cutting insert according to claim 1,
wherein the groove portion has a constant groove width in at least one of the one end side and the other end side with respect to the narrow width portion.

8. The cutting insert according to claim 1,
wherein a groove width at the other end of the narrow width portion in the groove portion is set to be in a range of 0.05×r to 0.18×r with respect to a radius r of the arcuate cutting edge portion of the cutting edge positioned at the other end side of the groove portion.

9. An indexable ball end mill in which the cutting insert according to claim 1 is detachably attached to an insert mounting seat which is formed at a tip end portion of an end mill main body rotatable about an axis by bringing a wall surface of the groove portion into contact with a projection portion protruding from a bottom surface of the insert mounting seat.

10. The indexable ball end mill according to claim 9,
wherein the projection portion is formed so as to be wider from the other end side toward the one end side in a direction in which the groove portion extends, in a portion which the narrow width portion of the groove portion abuts.

* * * * *